United States Patent
DeLano et al.

(10) Patent No.: US 12,121,829 B2
(45) Date of Patent: Oct. 22, 2024

(54) CHROMATOGRAPHIC SEAL AND COATED FLOW PATHS FOR MINIMIZING ANALYTE ADSORPTION

(71) Applicant: Waters Technologies Corporation, Milford, MA (US)

(72) Inventors: Mathew H. DeLano, Needham, MA (US); Matthew A. Lauber, North Smithfield, RI (US); Michael Donegan, Charlton, MA (US); Robert A. Jencks, Mendon, MA (US); Stephen J. Shiner, Holden, MA (US)

(73) Assignee: Waters Technologies Corporation, Milford, MA (US)

(*) Notice: Subject to any disclaimer, the term of this patent is extended or adjusted under 35 U.S.C. 154(b) by 718 days.

(21) Appl. No.: 16/800,928

(22) Filed: Feb. 25, 2020

(65) Prior Publication Data

US 2020/0269157 A1    Aug. 27, 2020

Related U.S. Application Data

(60) Provisional application No. 62/811,035, filed on Feb. 27, 2019.

(51) Int. Cl.
*B01D 15/22* (2006.01)
*C08J 7/06* (2006.01)
(Continued)

(52) U.S. Cl.
CPC .............. *B01D 15/22* (2013.01); *C08J 7/065* (2013.01); *G01N 30/32* (2013.01);
(Continued)

(58) Field of Classification Search
CPC ......... B01D 15/22; C08J 7/065; G01N 30/32; G01N 30/6026; G01N 30/603; G01N 30/6052; G01N 2030/027; G01N 2030/324
See application file for complete search history.

(56) References Cited

U.S. PATENT DOCUMENTS

| 2,801,186 A | 7/1957 | Alexander et al. |
| 4,469,597 A * | 9/1984 | Mott ..................... B01D 15/08 210/198.2 |

(Continued)

FOREIGN PATENT DOCUMENTS

| EP | 2915833 A1 | 9/2015 |
| GB | 2108403 A | 5/1983 |

(Continued)

OTHER PUBLICATIONS

Cheong. "Fritting techniques in chromatography." J. Sep. Sci. 37(2014): 603-617.

(Continued)

*Primary Examiner* — Benjamin L Lebron
(74) *Attorney, Agent, or Firm* — WOMBLE BOND DICKINSON (US) LLP; Deborah M. Vernon; Ricardo Joseph

(57) ABSTRACT

The present disclosure relates to a filter. The filter includes a porous element, a compression element and a housing. At least a portion of the porous element is coated with an alkylsilyl coating. The compression element is configured to receive the porous element thereby forming an assembly. The housing has an opening formed therein. The opening is configured to receive the assembly. The assembly is retained within the opening when the assembly is received therein.

25 Claims, 9 Drawing Sheets

(51) Int. Cl.
*G01N 30/02* (2006.01)
*G01N 30/32* (2006.01)
*G01N 30/60* (2006.01)

(52) U.S. Cl.
CPC ....... *G01N 30/6026* (2013.01); *G01N 30/603* (2013.01); *G01N 30/6052* (2013.01); *G01N 2030/027* (2013.01); *G01N 2030/324* (2013.01)

(56) References Cited

U.S. PATENT DOCUMENTS

| | | |
|---|---|---|
| 4,945,282 A | 7/1990 | Kawamura et al. |
| 4,999,162 A | 3/1991 | Wells et al. |
| 5,002,794 A | 3/1991 | Ratner et al. |
| 5,153,072 A | 10/1992 | Ratner et al. |
| 5,595,813 A | 1/1997 | Ogawa et al. |
| 5,643,436 A | 7/1997 | Ogawa et al. |
| 5,876,753 A | 3/1999 | Timmons et al. |
| 5,909,314 A | 6/1999 | Oka et al. |
| 6,013,372 A | 1/2000 | Hayakawa et al. |
| 6,054,227 A | 4/2000 | Greenberg et al. |
| 6,074,981 A | 6/2000 | Tada et al. |
| 6,121,608 A | 9/2000 | Takada et al. |
| 6,194,346 B1 | 2/2001 | Tada et al. |
| 6,207,263 B1 | 3/2001 | Takematsu et al. |
| RE37,183 E | 5/2001 | Kawamura et al. |
| 6,265,026 B1 | 7/2001 | Wang |
| 6,306,506 B1 | 10/2001 | Timmons et al. |
| 6,329,024 B1 | 12/2001 | Timmons et al. |
| 6,329,209 B1 | 12/2001 | Wagner et al. |
| 6,340,404 B1 | 1/2002 | Oka et al. |
| 6,383,642 B1 | 5/2002 | Le Bellac et al. |
| 6,440,565 B1 | 8/2002 | Kim et al. |
| 6,444,326 B1 | 9/2002 | Smith |
| 6,461,334 B1 | 10/2002 | Buch-Rasmussen et al. |
| 6,465,056 B1 | 10/2002 | Chabrecek et al. |
| 6,482,531 B1 | 11/2002 | Timmons et al. |
| 6,599,594 B1 | 7/2003 | Walther et al. |
| 6,660,338 B1 | 12/2003 | Hargreaves |
| 6,706,408 B2 | 3/2004 | Jelle |
| 6,783,800 B2 | 8/2004 | Saito et al. |
| 6,844,028 B2 | 1/2005 | Mao et al. |
| 6,873,387 B2 | 3/2005 | Hokazono et al. |
| 6,905,772 B2 | 6/2005 | Shoup et al. |
| 6,991,826 B2 | 1/2006 | Pellerite et al. |
| 7,067,194 B2 | 6/2006 | Mao et al. |
| 7,138,186 B2 | 11/2006 | Luten, III |
| 7,250,214 B2 | 7/2007 | Walter et al. |
| 7,285,674 B2 | 10/2007 | Palma et al. |
| 7,294,365 B2 | 11/2007 | Hayakawa et al. |
| 7,351,477 B2 | 4/2008 | Yamaya et al. |
| 7,387,836 B2 | 6/2008 | Gianolio et al. |
| 7,413,774 B2 | 8/2008 | Kobrin et al. |
| 7,419,636 B2 | 9/2008 | Aker et al. |
| 7,431,969 B2 | 10/2008 | Gleason et al. |
| 7,553,514 B2 | 6/2009 | Fan et al. |
| 7,629,029 B2 | 12/2009 | Mao et al. |
| 7,638,167 B2 | 12/2009 | Kobrin et al. |
| 7,687,239 B2 | 3/2010 | Goldberg et al. |
| 7,695,775 B2 | 4/2010 | Kobrin et al. |
| 7,776,396 B2 | 8/2010 | Kobrin et al. |
| 7,785,649 B2 | 8/2010 | Jung et al. |
| 7,815,922 B2 | 10/2010 | Chaney et al. |
| 7,842,393 B2 | 11/2010 | Kuzuya et al. |
| 7,879,396 B2 | 2/2011 | Kobrin et al. |
| 7,901,744 B2 | 3/2011 | Denes et al. |
| 7,955,656 B2 | 6/2011 | Murayama et al. |
| 7,955,704 B2 | 6/2011 | Lowery et al. |
| 8,008,225 B2 | 8/2011 | Henze et al. |
| 8,025,915 B2 | 9/2011 | Haines et al. |
| 8,105,821 B2 | 1/2012 | McGall et al. |
| 8,147,954 B2 | 4/2012 | Lee et al. |
| 8,163,354 B2 | 4/2012 | Dang et al. |
| 8,178,168 B2 | 5/2012 | O'Neill et al. |
| 8,178,602 B2 | 5/2012 | Mao et al. |
| 8,323,166 B2 | 12/2012 | Haines et al. |
| 8,349,408 B2 | 1/2013 | Dulka et al. |
| 8,366,814 B2 | 2/2013 | Jones et al. |
| 8,404,621 B2 | 3/2013 | Ikeda et al. |
| 8,512,864 B2 | 8/2013 | Konno et al. |
| 8,557,748 B2 | 10/2013 | Ikeda et al. |
| 8,580,355 B2 | 11/2013 | Durandeau et al. |
| 8,652,588 B2 | 2/2014 | Teer et al. |
| 8,668,972 B2 | 3/2014 | Lewis et al. |
| 8,691,104 B2 | 4/2014 | Greer et al. |
| 8,709,588 B2 | 4/2014 | Cadet et al. |
| 8,741,158 B2 | 6/2014 | Aytug et al. |
| 8,778,278 B2 | 7/2014 | Xiong et al. |
| 8,784,565 B2 | 7/2014 | Hillabrand et al. |
| 8,795,787 B2 | 8/2014 | Jehle |
| 8,841,070 B2 | 9/2014 | Harnack et al. |
| 8,992,590 B2 | 3/2015 | Ott et al. |
| 8,993,479 B2 | 3/2015 | Zuilhof et al. |
| 9,034,660 B2 | 5/2015 | Boday et al. |
| 9,075,189 B2 | 7/2015 | West |
| 9,108,012 B2 | 8/2015 | Pryce Lewis et al. |
| 9,175,026 B2 | 11/2015 | Garrell et al. |
| 9,255,929 B2 | 2/2016 | Jiang et al. |
| 9,272,095 B2 | 3/2016 | Felts et al. |
| 9,308,520 B2 | 4/2016 | Ekeroth |
| 9,340,880 B2 | 5/2016 | Mattzela |
| 9,364,853 B2 | 6/2016 | Chen |
| 9,388,315 B2 | 7/2016 | Hoshino |
| 9,445,504 B2 | 9/2016 | Kang et al. |
| 9,475,225 B2 | 10/2016 | Giraud et al. |
| 9,523,004 B2 | 12/2016 | Hervieu et al. |
| 9,533,006 B2 | 1/2017 | Jiang et al. |
| 9,541,480 B2 | 1/2017 | Chang et al. |
| 9,556,360 B2 | 1/2017 | McGall et al. |
| 9,777,368 B2 | 10/2017 | Smith et al. |
| 9,915,001 B2 | 3/2018 | Yuan et al. |
| 9,925,521 B2 | 3/2018 | Wyndham et al. |
| 9,975,143 B2 | 5/2018 | Smith et al. |
| 2001/0021446 A1 | 9/2001 | Takematsu et al. |
| 2002/0016250 A1 | 2/2002 | Hayakawa et al. |
| 2002/0026899 A1 | 3/2002 | McLaughlin et al. |
| 2002/0142621 A1 | 10/2002 | Wang |
| 2002/0195950 A1 | 12/2002 | Mikhael et al. |
| 2003/0059573 A1 | 3/2003 | Timmons et al. |
| 2003/0109062 A1 | 6/2003 | Inomata et al. |
| 2003/0113477 A1 | 6/2003 | Timmons et al. |
| 2003/0138645 A1 | 7/2003 | Gleason et al. |
| 2004/0261703 A1 | 12/2004 | Kobrin et al. |
| 2005/0118595 A1 | 6/2005 | Lahann |
| 2005/0164402 A1 | 7/2005 | Belisle et al. |
| 2006/0073521 A1 | 4/2006 | Saito et al. |
| 2006/0110594 A1 | 5/2006 | Frutos et al. |
| 2006/0213441 A1 | 9/2006 | Kobrin et al. |
| 2006/0219598 A1 | 10/2006 | Cody et al. |
| 2006/0251795 A1 | 11/2006 | Kobrin et al. |
| 2007/0048747 A1 | 3/2007 | Leslie et al. |
| 2007/0122308 A1 | 5/2007 | Ikeda et al. |
| 2007/0172666 A1 | 7/2007 | Denes et al. |
| 2007/0295663 A1* | 12/2007 | Iraneta ................ G01N 30/603 210/656 |
| 2008/0041105 A1 | 2/2008 | Hahn et al. |
| 2008/0170230 A1 | 7/2008 | Gerion |
| 2008/0188010 A1 | 8/2008 | Saitoh et al. |
| 2008/0248589 A1 | 10/2008 | Belisle et al. |
| 2008/0312356 A1 | 12/2008 | Kobrin et al. |
| 2009/0020712 A1 | 1/2009 | Matsumoto |
| 2009/0081371 A1 | 3/2009 | Minami et al. |
| 2009/0162571 A1 | 6/2009 | Haines et al. |
| 2009/0176084 A1 | 7/2009 | Yoshihara et al. |
| 2009/0206034 A1 | 8/2009 | Nakajima |
| 2009/0286435 A1 | 11/2009 | Badyal et al. |
| 2009/0318609 A1 | 12/2009 | Badyal et al. |
| 2010/0080903 A1 | 4/2010 | Tamitsuji et al. |
| 2010/0178512 A1 | 7/2010 | Giesenberg et al. |
| 2010/0196724 A1 | 8/2010 | Yamasaki et al. |
| 2010/0200207 A1 | 8/2010 | Fukuda et al. |
| 2010/0203646 A1 | 8/2010 | Larsen et al. |
| 2010/0330278 A1 | 12/2010 | Choi et al. |

(56) References Cited

U.S. PATENT DOCUMENTS

| | | |
|---|---|---|
| 2011/0000658 A1 | 1/2011 | Tanaka et al. |
| 2011/0062047 A1 | 3/2011 | Haines et al. |
| 2011/0120213 A1 | 5/2011 | Hirayama et al. |
| 2011/0127062 A1 | 5/2011 | Allen et al. |
| 2011/0189493 A1 | 8/2011 | Ott et al. |
| 2012/0069295 A1 | 3/2012 | Fukagawa et al. |
| 2012/0123345 A1 | 5/2012 | Felts et al. |
| 2012/0178848 A1 | 7/2012 | Adkinson et al. |
| 2012/0219697 A1 | 8/2012 | Chen |
| 2012/0219727 A1 | 8/2012 | Gandhiraman et al. |
| 2012/0251797 A1 | 10/2012 | Smith et al. |
| 2012/0252709 A1 | 10/2012 | Felts et al. |
| 2012/0288717 A1 | 11/2012 | Mao et al. |
| 2013/0004780 A1 | 1/2013 | Hervieu et al. |
| 2013/0025503 A1 | 1/2013 | Park et al. |
| 2013/0029138 A1 | 1/2013 | Benard et al. |
| 2013/0157062 A1 | 6/2013 | Kihara et al. |
| 2013/0244025 A1 | 9/2013 | Smith et al. |
| 2013/0266762 A1 | 10/2013 | Mayers et al. |
| 2013/0337226 A1 | 12/2013 | Curran et al. |
| 2014/0004022 A1 | 1/2014 | Sagona et al. |
| 2014/0065368 A1 | 3/2014 | Aytug et al. |
| 2014/0147631 A1 | 5/2014 | Yang et al. |
| 2014/0154399 A1 | 6/2014 | Weikart et al. |
| 2014/0187666 A1 | 7/2014 | Aizenberg et al. |
| 2014/0202355 A1 | 7/2014 | Hoshino |
| 2014/0287240 A1 | 9/2014 | Murotani et al. |
| 2014/0299538 A1 | 10/2014 | Gleason et al. |
| 2014/0318748 A1 | 10/2014 | Svensson et al. |
| 2014/0323981 A1 | 10/2014 | Giraud et al. |
| 2014/0342954 A1 | 11/2014 | Ingber et al. |
| 2014/0357091 A1 | 12/2014 | Mattzela |
| 2014/0370300 A1 | 12/2014 | Smith |
| 2015/0021339 A1 | 1/2015 | Felts et al. |
| 2015/0024152 A1 | 1/2015 | Carr et al. |
| 2015/0030885 A1 | 1/2015 | Smith |
| 2015/0064376 A1 | 3/2015 | Smith et al. |
| 2015/0064451 A1 | 3/2015 | Kalaga et al. |
| 2015/0098084 A1 | 4/2015 | Felts et al. |
| 2015/0118502 A1 | 4/2015 | Mitsuhashi et al. |
| 2015/0118504 A1 | 4/2015 | Ohshita et al. |
| 2015/0122365 A1 | 5/2015 | Carr et al. |
| 2015/0152124 A1 | 6/2015 | Mori et al. |
| 2015/0175814 A1 | 6/2015 | Aizenberg et al. |
| 2015/0209846 A1 | 7/2015 | Aizanberg et al. |
| 2015/0210951 A1 | 7/2015 | Aizenberg et al. |
| 2015/0232806 A1 | 8/2015 | Jung et al. |
| 2015/0239773 A1 | 8/2015 | Aytug |
| 2015/0247051 A1 | 9/2015 | Ha et al. |
| 2015/0273522 A1 | 10/2015 | Boscher et al. |
| 2015/0283307 A1 | 10/2015 | Smith et al. |
| 2015/0298165 A1 | 10/2015 | Smith |
| 2015/0307525 A1 | 10/2015 | Higano et al. |
| 2015/0307719 A1 | 10/2015 | Mitsuhashi et al. |
| 2015/0309216 A1 | 10/2015 | Fournand |
| 2015/0322272 A1 | 11/2015 | Pokroy et al. |
| 2015/0329725 A1 | 11/2015 | Liu |
| 2016/0002488 A1 | 1/2016 | Takao et al. |
| 2016/0002489 A1 | 1/2016 | Gleason et al. |
| 2016/0038972 A1 | 2/2016 | Lu |
| 2016/0040039 A1 | 2/2016 | Yamane et al. |
| 2016/0059260 A1 | 3/2016 | Smith et al. |
| 2016/0074862 A1 | 3/2016 | Breaux et al. |
| 2016/0168021 A1 | 6/2016 | Goh et al. |
| 2016/0200941 A1 | 7/2016 | Liu et al. |
| 2016/0231594 A1 | 8/2016 | Ang et al. |
| 2016/0243308 A1 | 8/2016 | Giraud et al. |
| 2016/0251261 A1 | 9/2016 | Bureau |
| 2016/0302723 A1 | 10/2016 | Chen |
| 2016/0340544 A1 | 11/2016 | Katsukawa et al. |
| 2017/0001956 A1 | 1/2017 | Chau et al. |
| 2017/0044315 A1 | 2/2017 | Mitsuhashi et al. |
| 2017/0173223 A1 | 6/2017 | Delaney, Jr. et al. |
| 2019/0032201 A1 | 1/2019 | Smith et al. |

FOREIGN PATENT DOCUMENTS

| | | |
|---|---|---|
| JP | 2012232870 A | 11/2012 |
| WO | 2010009311 A1 | 1/2010 |
| WO | 2010135660 A2 | 11/2010 |
| WO | 2014197783 A1 | 12/2014 |
| WO | 2019053693 A1 | 3/2019 |

OTHER PUBLICATIONS

Rahimi et al. "Application of copolymer coated frits for solid-phase extraction of poly cyclic aromatic hydrocarbons in water samples." Anal. Chim. Acta. 836(2014): 45-52.

Al-Hamarneh et al. "Synthesis and characterization of di(ethylene glycol) vinyl ether films deposited by atmospheric pressure corona discharge plasma." Surface Coatings Technol. 234(2013):33-41.

Beigbeder et al. "Marine Fouling Release Silicone/Carbon Nanotube Nanocomposite Coatings: On the Importance of the Nanotube Dispersion State." J. Nanosci. Nanotech, 10(2010): 2972-2978.

BIOCYL™ X1, Dec. 20, 2018.

Carretier et al. "Design of PVDF/PEGMA-b-PS-b-PEGMA membranes by VIPS for improved biofouling mitigation." J. Membrane Sci. 510(2016):355-369.

Dursan® Coating for Improved, Metal-Free Liquid Chromatography. Dec. 20, 2018.

Dursan® Data Sheet 2018.

HPLC Hardware. Moller Medical. (2007).

Hsieh et al. "Effective Enhancement of Fluorescence Detection Efficiency in Protein Microarray assays: Application of a Highly Fluorinated Organosilane as the Blocking Agent on the Background Surface by a Facile Vapor-Phase Deposition Process." Anal. Chem. 81(2009): 7908-7916.

Kaliaraj et al. "Bio-inspired YSZ coated titanium by EB-PVD for biomedical applications." Surface and Coatings Technol. 307(2016): 227-235.

Lauber et al. "Rapid Preparation of Released N-Glycans for HILIC Analysis Using a Labeling Reagent that Facilitates Sensitive Fluorescence and ESI-MS Detection." Anal Chem. 87.10(2015): 5401-9.

Lecloux et al. "The safe use of carbon nanotubes in coating applications." OECD Conference on Benefits of nanomaterials. Paris, Jul. 15-17, 2009.

NanoCoatings Product Information. Möller Medical. (2010).

Rosmaninho et al. "Modified stainless steel surfaces targeted to reduce fouling—Evaluation of fouling by milk components." J. Food Engineering. 80(2007): 1176-1187.

Shih et al. "Silanization of Stainless-Steel Frits for Use in Trace Metal Analysis by High Performance Liquid Chromatography." Talanta. 28(1981): 411-414.

Sun et al. "Vapor-based Grafting of Crosslinked Poly(N-vinyl pyrrolidone) Coatings with Tuned Hydrophilicity and Anti-Biofouling Properties." J. Mater. Chem. B. 4(2016): 2669-2678.

Vaidya et al. "Protein-resistant properties of a chemical vapor deposited alkyl-functional carboxysilane coating characterized using quartz crystal microbalance." Appl. Surface Sci. 364(2016): 896-908.

Velox Plus, Dec. 20, 2018.

Xue et al. "Surface-modified anodic aluminum oxide membrane with hydroxyethyl celluloses as a matrix for bilirubin removal." J. Chromatog. B. 912(2013):1-7.

Yang et al. "Synergistic Prevention of Biofouling in Seawater Desalination by Zwitterionic Surfaces and Low-Level Chloronation." Adv. Mater. 26(2014): 1711-1718.

\* cited by examiner

| COATING # | DEPOSITED MATERIAL | ALTERNATIVE COATING ABBREVIATION | ALKYL SILYL COATING REAGENT | CHARGE MODIFIER ($R^C$) REAGENT | HYDROPHOBICITY MODIFIER ($R^B$) REAGENT |
|---|---|---|---|---|---|
| 1 | BIS(TRICHLOROSILYL)ETHANE FOLLOWED BY TRIMETHOXY SILYL PROPYL METHYL PHOSPHONATE | $C_2$-PHOSPHONATE | | | N/A |
| 2 | BIS(TRICHLOROSILYL)ETHANE FOLLOWED BY TRIMETHOXY SILYL PROPYL METHYL PHOSPHONATE FOLLOWED BY n-DECYL TRICHLOROSILANE | $C_2$-PHOSPHONATE -$C_{10}$ | | | |
| 3 | BIS(TRICHLOROSILYL)ETHANE FOLLOWED BY N,N-(DIETHYLAMINOPROPYL) TRIMETHOXYSILANE | $C_2$-DEAP | | | N/A |
| 4 | BIS(TRICHLOROSILYL)ETHANE FOLLOWED BY N,N-(DIETHYLAMINOPROPYL) TRIMETHOXYSILANE FOLLOWED BY n-DECYL TRICHLOROSILANE | $C_2$-DEAP-$C_{10}$ | | | |
| 5 | BIS(TRICHLOROSILYL)ETHANE FOLLOWED BY N,N-(DIETHYLAMINOPROPYL) TRIMETHOXYSILANE FOLLOWED BY N-(3-TRIETHOXYSILYLPROPYL) GLUCONAMIDE | $C_2$-DEAP-GLUCO | | | |

FIG. 7

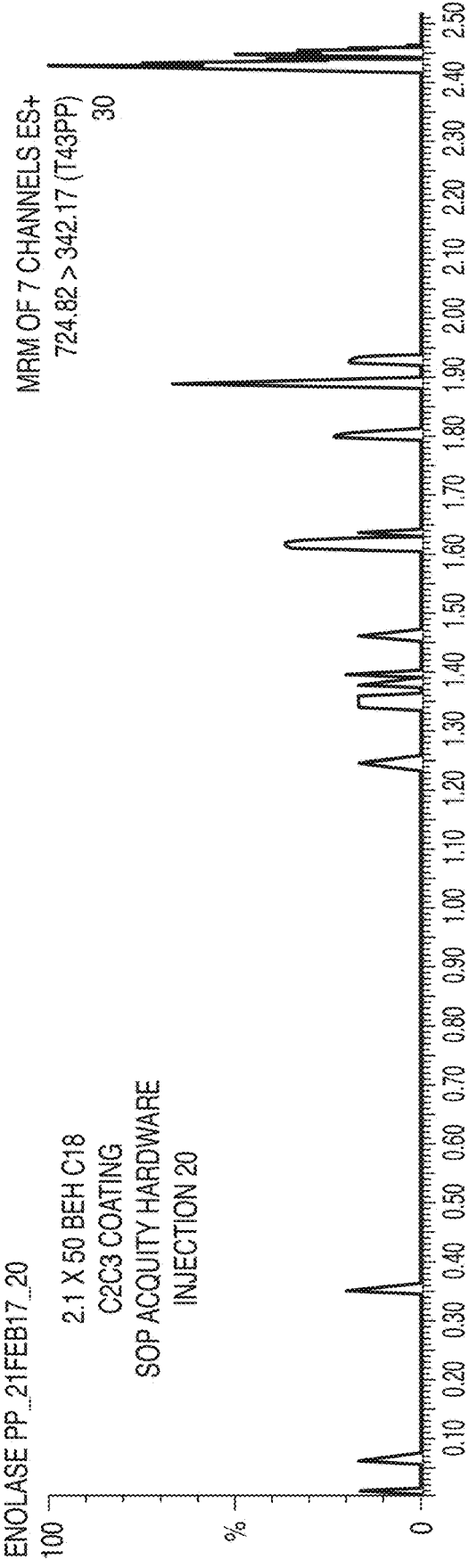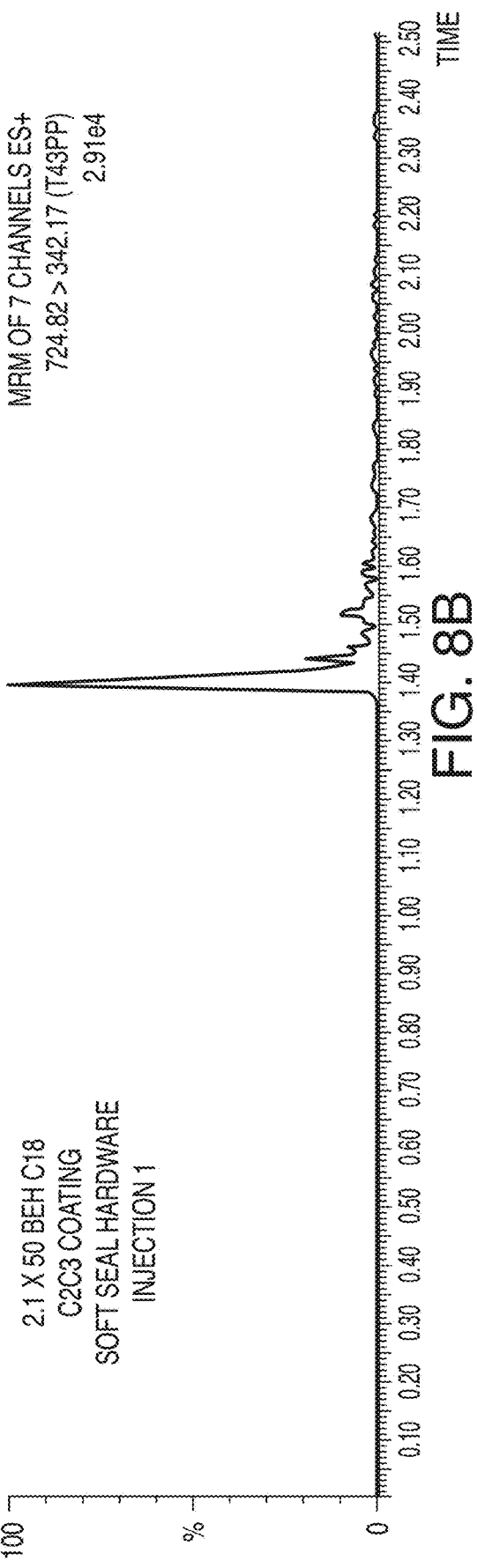

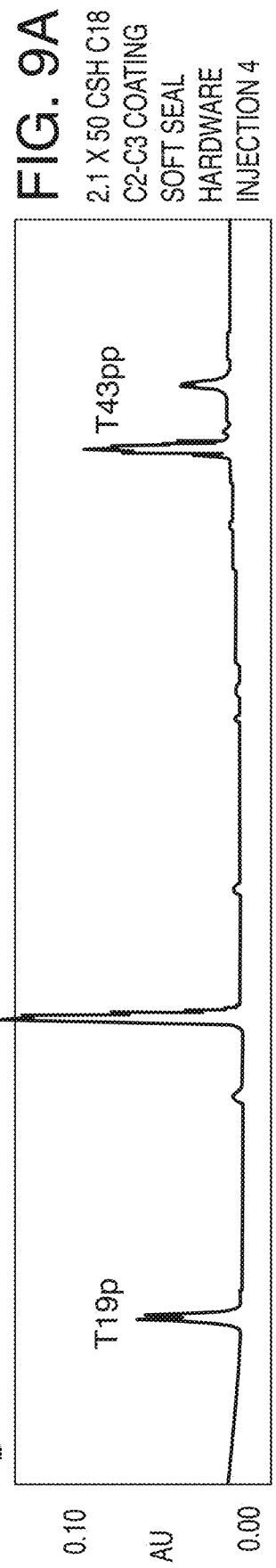
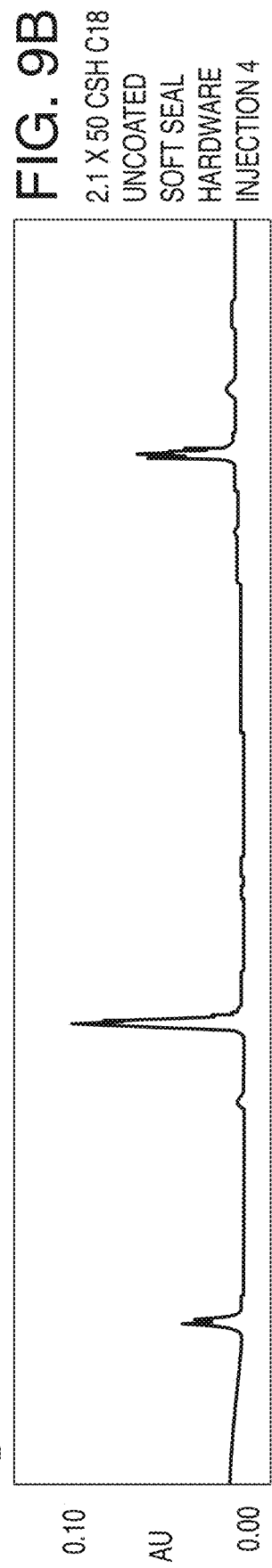
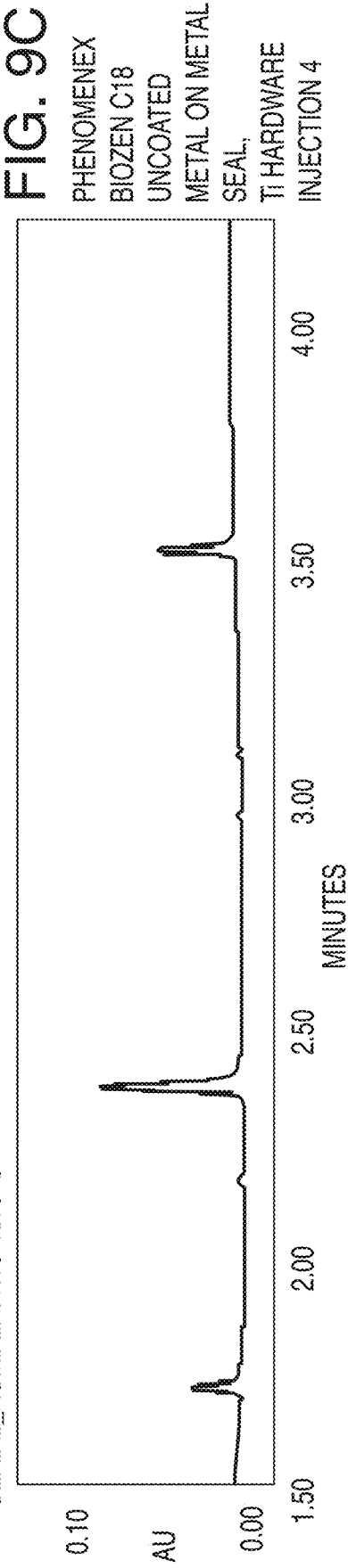

CHROMATOGRAPHIC SEAL AND COATED FLOW PATHS FOR MINIMIZING ANALYTE ADSORPTION

CROSS-REFERENCE TO RELATED APPLICATION

This application claims priority to and benefit of U.S. provisional patent application No. 62/811,035 filed on Feb. 27, 2019 and entitled "Chromatographic Seal and Coated Flow Paths for Minimizing Analyte Adsorption," the entire contents of which is hereby incorporated by reference.

FIELD OF THE TECHNOLOGY

The present disclosure relates to coated chromatographic seals and coated flow paths for minimizing analyte adsorption in a chromatography system. More specifically, the present disclosure relates to soft seal technology and flow paths of a chromatographic system, each coated with an alkylsilyl coating, wherein the alkysilyl coating is undamaged when the soft seal is used to connect the chromatographic flow paths and/or two chromatographic components.

BACKGROUND

Liquid chromatography (LC) systems are used to carry out chemical separations. A typical liquid chromatography system consists of the following major components: a pump, an injector, a column, and a detector. The pump compels a mobile phase, for example, a solution, through a fluid path comprising an injector, column and detector. The injector permits the introduction of samples into the fluid stream above the column. The column contains a packed bed of media. The media is normally porous and relatively inert. Compounds in the sample will exhibit a characteristic affinity to the media. That is, some compounds exhibit high affinity and some compounds exhibit low affinity. As a result, as the compounds are carried through the media, the compounds separate into bands which elute or come off the column at different times. These bands are detected by the detector.

Sintered porous filters are widely used at the inlet and outlet of chromatographic columns for the retention of the media in the columns. Sintered filters are typically made by compacting particles having a controlled particle size distribution into a desired shape, and then sintering to form an interconnected network of pores within the filter. Filters commonly used for chromatographic purposes can be made from a variety of materials, such as stainless steel, titanium, polyetheretherketone (PEEK), or polyethylene. The majority of columns in use today are manufactured using 316 stainless steel filters, since this material provides a good balance of high strength, low cost, and corrosion resistance.

Sintered porous metal filters capable of retaining small particulates are typically made by pressing or molding metal or metal alloy powders into a desired shape. The formed shape is then sintered at high temperatures to provide a consolidated porous object. These porous materials are manufactured for specific applications and have characteristics that are dependent on the size, shape, and type of powder, in addition to the compression and temperature of the process.

Conventional sintered filters are sealed within the column, or within a housing coupled to the column, using an interference fit between the filter and a receiving bore in the mating portion of the column or housing. As the filter is pressed into the receiving bore, the interference can cause damage along the circumference and/or face of the filter. The damage can result in regions of the filter having undesirable flow characteristics. For example, damage to the filter can cause faster flow in the middle of the column than at the outer wall. These undesirable flow characteristics can cause excessive peak tailing, as well as other problems.

Other chromatographic components are connected and sealed to each other, for example, where tubing connects to an instrument (e.g., a detector), where a tube seals to an injector, or where tubing seals to a union. This type of connection and sealing is typically done using metal components in two ways: a ferrule connection/seal or a face seal connection.

The use of metal chromatographic components and seals can be problematic when separating analytes that interact with metal and those analytes have often proven to be very challenging to separate. The desire to have high pressure capable chromatographic systems with minimal dispersion has required that flow paths decrease in diameter and be able to withstand increasingly high pressures at increasingly fast flow rates. As a result, the material of choice for chromatographic flow paths is often metallic in nature. This is despite the fact that characteristics of certain analytes, for example, biomolecules, proteins, glycans, peptides, oligonucleotides, pesticides, bisphosphonic acids, anionic metabolites, and zwitterions like amino acids and neurotransmitters, are known to have unfavorable interactions, so called chromatographic secondary interactions, with metallic surfaces.

The proposed mechanism for metal specific binding interactions requires an understanding of Lewis theory of acid-base chemistry. Pure metals and metal alloys (along with their corresponding oxide layers) have terminal metal atoms that have characteristics of a Lewis acid. More simply, these metal atoms show a propensity to accept donor electrons. This propensity is even more pronounced with any surface metal ions bearing a positive charge. Analytes with sufficient Lewis base characteristics (any substance that can donate non-bonding electrons) can potentially adsorb to these sites and thus form problematic non-covalent complexes. It is these substances that are defined as metal-interacting analytes.

For example, analytes having phosphate groups are excellent polydentate ligands capable of high affinity metal chelation. This interaction causes phosphorylated species to bind to the flow path metals thus reducing the detected amounts of such species, a particularly troublesome effect given that phosphorylated species are frequently the most important analytes of an assay.

Other characteristics of analytes can likewise pose problems. For example, carboxylate groups also have the ability to chelate to metals, albeit with lower affinities than phosphate groups. Yet, carboxylate functional groups are ubiquitous in, for example, biomolecules, giving the opportunity for cumulative polydentate-based adsorptive losses. These complications can exist not only on peptides and proteins, but also glycans. For example, N-glycan species can at times contain one or more phosphate groups as well as one or more carboxylate containing sialic acid residues. Additionally, smaller biomolecules such as nucleotides and saccharides, like sugar phosphates, can exhibit similar behavior to the previously mentioned N-glycan molecules. Moreover, chromatographic secondary interactions can be especially problematic with biomolecules, particularly larger structures, because they have a capacity (via their size and structural order) to form microenvironments that can adversely interact with separation components and flow path surfaces. In this case, a biomolecule or analyte having larger structures, can present structural regions with chemical properties that amplify a secondary interaction to the material of a flow path. This, combined with the cumulative metal chelation effects curtails the overall effective separation of biomolecules, pesticides, bisphosphonic acids, anionic metabolites, and zwitterions like amino acids and meurotransmitters.

An alternative to using metal flow paths is to use flow paths constructed from polymeric materials, such a polyether ether ketone (PEEK). PEEK tubing, like most polymeric materials, is formed by means of an extrusion process. With polymeric resin, this manufacturing process can lead to highly variable internal diameters. Accordingly, PEEK column hardware yields unfavorable differences in the retention times as can be observed from switching between one column and the next. Often, this variation can be a factor of three higher than a metal constructed column. In addition, the techniques for fabricating polymer based frits are not yet sufficiently optimized to afford suitably rugged components for commercial HPLC columns. For example, commercially available PEEK frits tend to exhibit unacceptably low permeability.

Ongoing efforts to reduce chelation and unwanted secondary chromatographic interactions of analytes with metal (or other) chromatographic surfaces in an effort to facilitate chromatographic separation having higher resolutions are therefore needed.

SUMMARY

There are two aspects of the technology that work together to minimize unwanted analyte adsorption in a chromatography system and result in chromatographic separations that have higher resolutions. The first aspect of the technology is a thin alkylsilyl coating which can be applied either entirely or partially over flow path surfaces, most particularly to those that come into contact with an analyte molecule and those that are constituents of a liquid chromatography (LC) instrument or chromatographic column. The alkylsilyl coating can be inert to the analytes or can be an active coating that interacts with the analytes or mobile phase to affect the chromatographic separation. However, when a traditional seal/connector is used, for example, a metal on metal gasket or filter housing type of approach, the metals are crushed into one another in order to sufficiently fill any gaps and to raise the gasket stress above that of the operating pressure. While this approach is highly successful at preventing leaks, it causes damage to the components themselves as well as any surface coatings that have been applied to the chromatographic components and/or connector/seal. Therefore, the second aspect of the technology is the use of a "soft seal" that ensures that the potentially friable surface imparted by a coating is left uncompromised at the time a column is assembled to an LC part, like a transfer line, is wrenched together. This combination of an alkylsilyl coating on at least a portion of the chromatographic flow path along with the use of a coated "soft seal," minimizes the loss of analytes to chromatographic flow path. This combination of chemical and physical considerations achieves low sample loss flow paths.

In one aspect, the technology relates to a filter that includes a porous element, a compression element and a housing. At least a portion of the porous element is coated with an alkylsilyl coating. The compression element is configured to receive the porous element thereby forming an assembly. The housing has an opening formed therein. The opening is configured to receive the assembly. The assembly is retained within the opening when the assembly is received therein. The filter can include one or more of the embodiments described herein.

In some embodiments, the compression element has a surface coated with the alkylsilyl coating. The housing can have a surface coated with the alkylsilyl coating. The alkylsily coating can be on every internal and external surface of the filter, for example, the coating can be on every internal and external surface of the porous element, the compression element and the housing. In some embodiments, the alkylsilyl coating can be on a portion of the surfaces.

In some embodiments, the compression element is plastic or an elastomeric material. The compression element can have a compressive modulus of less than about 1,400,00 psi. The compression element can have a hardness of less than about 120 Rockwell M. The compression element can have a dynamic friction coefficient against steel of less than about 0.35. In some embodiments, the compression element is a polyetheretherketone ring.

In some embodiments, the porous element is a frit. The internal porosity of the frit can have the alkylsilyl coating.

In some embodiments, the alkylsilyl coating is a bioinert, low-bind coating. The alkylsilyl coating can have the Formula I:

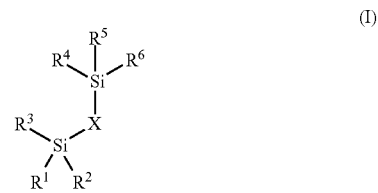

$R^1$, $R^2$, $R^3$, $R^4$, $R^5$, and $R^6$ are each independently selected from $(C_1-C_6)$alkoxy, $-NH(C_1-C_6)$alkyl, $-N((C_1-C_6)$alkyl$)_2$, OH, $OR^A$, and halo. $R^A$ represents a point of attachment to the interior surfaces of the fluidic system. At least one of $R^1$, $R^2$, $R^3$, $R^4$, $R^5$, and $R^6$ is $OR^A$. X is $(C_1-C_{20})$alkyl, $-O[(CH_2)_2O]_{1-20}-$, $-(C_1-C_{10})[NH(CO)NH(C_1-C_{10})]_{1-20}-$, or $-(C_1-C_{10})[alkylphenyl(C_1-C_{10})alkyl]_{1-20}-$.

In some embodiments, X is $(C_2-C_{10})$alkyl. X can be ethyl. In some embodiments, $R^1$, $R^2$, $R^3$, $R^4$, $R^5$, and $R^6$ are each methoxy or chloro. In some embodiments, the alkylsilyl coating of Formula I is bis(trichlorosilyl)ethane or bis(trimethoxysilyl)ethane.

In some embodiments, the filter includes a second alkylsilyl coating in direct contact with the alkylsilyl coating of Formula I. The second alkylsilyl coating has the Formula II:

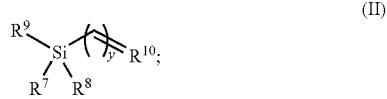

$R^7$, $R^8$, and $R^9$ are each independently selected from $-NH(C_1-C_6)$alkyl, $-N[(C_1-C_6)$alkyl]2, $(C_1-C_6)$alkoxy, $(C_1-C_6)$alkyl, $(C_1-C_6)$alkenyl, OH, and halo. $R^{10}$ is selected from $(C_1-C_6)$alkyl, $-OR^B$, $-[O(C_1-C_3)$alkyl$]_{1-10}O(C_1-C_6)$alkyl, and phenyl. The $(C_1-C_6)$alkyl is optionally substituted with one or more halo. The phenyl is optionally substituted with one or more groups selected from $(C_1-C_3)$alkyl, hydroxyl, fluorine, chlorine, bromine, cyano, $-C(O)NH_2$, and carboxyl. $R^B$ is $-(C_1-C_3)$alkyloxirane, $-(C_1-C_3)$alkyl-3,4-epoxycyclohexyl, or —$(C_1-C_4)$alkylOH. The hashed bond to $R^{10}$ represents an optional additional covalent bond between $R^{10}$ and the carbon bridging the silyl group to form an alkene, provided y is not 0. y is an integer from 0 to 20.

In some embodiments, y is an integer from 2 to 9. In some embodiments, y is 9, $R^{10}$ is methyl, and $R^7$, $R^8$, and $R^9$ are each methoxy, ethoxy or chloro. The alkylsilyl coating for Formula II can be (3-glycidyloxypropyl)trimethoxysilane, n-decyltrichlorosilane, trimethylchlorosilane, trimethyldimethyaminosilane, or methoxy-polyethyleneoxy(1-10)silane. In some embodiments, the alkylsilyl coating of Formula II is (3-glycidyloxypropyl)trimethoxysilane followed by hydrolysis.

In some embodiments, the alkylsilyl coating of Formula I is bis(trichlorosilyl)ethane or bis(trimethoxysilyl)ethane and the alkylsilyl coating of Formula II is (3-glycidyloxypropyl)trimethoxysilane. The alkylsilyl coating of Formula I can be bis(trichlorosilyl)ethane or bis(trimethoxysilyl)ethane and the alkylsilyl coating of Formula II can be (3-glycidyloxypropyl)trimethoxysilane followed by hydrolysis. In some embodiments, the alkylsilyl coating of Formula I is bis(trichlorosilyl)ethane or bis(trimethoxysilyl)ethane and the alkylsilyl coating of Formula II is n-decyltrichlorosilane. The alkylsilyl coating of Formula I can be bis(trichlorosilyl)ethane or bis(trimethoxysilyl)ethane and the alkylsilyl coating of Formula II can be trimethylchlorosilane or trimethyldimethyaminosilane. In some embodiments, the alkylsilyl coating of Formula I is bis(trichlorosilyl)ethane or bis(trimethoxysilyl)ethane and the alkylsilyl coating of Formula II is methoxy-polyethyleneoxy(3)silane.

The filter can also include a alkylsilyl coating having the Formula III in direct contact with the alkylsilyl coating of Formula I. The alkylsilyl coating of Formula III is:

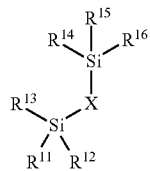

(III)

$R^{11}$, $R^{12}$, $R^{13}$, $R^{14}$, $R^{15}$, and $R^{16}$ are each independently selected from $(C_1-C_6)$alkoxy, —$NH(C_1-C_6)$alkyl, —$N((C_1-C_6)$alkyl$)_2$, OH, and halo. Z is $(C_1-C_{20})$alkyl, —$O[(CH_2)_2O]_{1-20}$—, —$(C_1-C_{10})[NH(CO)NH(C_1-C_{10})]_{1-20}$—, or —$(C_1-C_{10})$[alkylphenyl$(C_1-C_{10})$alkyl]$_{1-20}$-.

In some embodiments, the alkylsilyl coating of Formula III is bis(trichlorosilyl)ethane or bis(trimethoxysilyl)ethane. The alkylsilyl coating of Formula I can be bis(trichlorosilyl)ethane or bis(trimethoxysilyl)ethane and the alkylsilyl coating of Formula III can be bis(trichlorosilyl)ethane or bis(trimethoxysilyl)ethane.

In another aspect, the technology features a chromatographic column for separating analytes in a sample. The chromatographic column includes a column body having an interior surface. At least a portion of the interior surface is coated with an alkylsilyl coating. The chromatographic column also includes a filter configured to connect to the column. The filter includes a porous element, a compression element and a housing. At least a portion of the porous element is coated with the alkylsilyl coating. The compression element is configured to receive the porous element thereby forming and assembly. The housing has an opening formed therein. The opening is configured to receive the assembly. The assembly is retained within the opening when the assembly is received therein. The alkylsilyl coating is undamaged when the filter is connected to the column body.

In some embodiments, the compression element has a surface coated with the alkylsilyl coating. The housing can have a surface coated with the alkylsilyl coating. The alkylsily coating can be on every internal and external surface of the filter, for example, the coating can be on every internal and external surface of the porous element, the compression element and the housing. In some embodiments, the alkylsilyl coating can be on a portion of the surfaces.

In some embodiments, the compression element is plastic or an elastomeric material. The compression element can have a compressive modulus of less than about 1,400,00 psi. The compression element can have a hardness less than about 120 Rockwell M. The compression element can have a dynamic friction coefficient against steel of less than about 0.35.

In some embodiments, the alkylsilyl coating is inert to at least one of the analytes in the sample. In some embodiments, the alkylsilyl coating is an "active coating" that interacts with at least one analyte in the sample to affect the chromatographic separation.

In some embodiments, the alkylsilyl coating is a bioinert, low-bind coating. The alkylsilyl coating can have the Formula I:

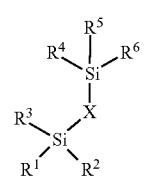

(I)

$R^1$, $R^2$, $R^3$, $R^4$, $R^5$, and $R^6$ are each independently selected from $(C_1-C_6)$alkoxy, —$NH(C_1-C_6)$alkyl, —$N((C_1-C_6)$alkyl$)_2$, OH, $OR^A$, and halo. $R^A$ represents a point of attachment to the interior surfaces of the fluidic system. At least one of $R^1$, $R^2$, $R^3$, $R^4$, $R^5$, and $R^6$ is $OR^A$. X is $(C_1-C_{20})$alkyl, —$O[(CH_2)_2O]_{1-20}$—, —$(C_1-C_{10})[NH(CO)NH(C_1-C_{10})]_{1-20}$—, or —$(C_1-C_{10})$[alkylphenyl$(C_1-C_{10})$alkyl]$_{1-20}$-.

In some embodiments, X is $(C_2-C_{10})$alkyl. X can be ethyl. In some embodiments, $R^1$, $R^2$, $R^3$, $R^4$, $R^5$, and $R^6$ are each methoxy or chloro. The alkylsilyl coating of Formula I can be bis(trichlorosilyl)ethane or bis(trimethoxysilyl)ethane.

The chromatographic column can also include a second alkylsilyl coating in direct contact with the alkylsilyl coating of Formula I. The second alkylsilyl coating has the Formula II:

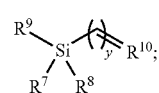

(II)

$R^7$, $R^8$, and $R^9$ are each independently selected from —$NH(C_1-C_6)$alkyl, —$N[(C_1-C_6)$alkyl]2, $(C_1-C_6)$alkoxy, $(C_1-C_6)$alkyl, $(C_1-C_6)$alkenyl, OH, and halo. $R^{10}$ is selected from $(C_1-C_6)$alkyl, —$OR^B$, —$[O(C_1-C_3)$alkyl$]_{1-10}O(C_1-C_6)$alkyl, and phenyl. The $(C_1-C_6)$alkyl is optionally substituted with one or more halo. The phenyl is optionally substituted with one or more groups selected from $(C_1-C_3)$alkyl, hydroxyl, fluorine, chlorine, bromine, cyano, —C(O)NH$_2$, and carboxyl. R$^B$ is —(C$_1$-C$_3$)alkyloxirane, —(C$_1$-C$_3$)alkyl-3,4-epoxycyclohexyl, or —(C$_1$-C$_4$)alkylOH. The hashed bond to R$^{10}$ represents an optional additional covalent bond between R$^{10}$ and the carbon bridging the silyl group to form an alkene, provided y is not 0. y is an integer from 0 to 20.

In some embodiments, y is an integer from 2 to 9. In some embodiments, y is 9, R$^{10}$ is methyl, and R$^7$, R$^8$, and R$^9$ are each methoxy, ethoxy or chloro. The alkylsilyl coating of Formula II can be (3-glycidyloxypropyl)trimethoxysilane, n-decyltrichlorosilane, trimethylchlorosilane, trimethyldimethyaminosilane, or methoxy-polyethyleneoxy(1-10)silane. In some embodiments, the alkylsilyl coating of Formula II is (3-glycidyloxypropyl)trimethoxysilane followed by hydrolysis. The alkylsilyl coating of Formula I can be bis(trichlorosilyl)ethane or bis(trimethoxysilyl)ethane and the alkylsilyl coating of Formula II can be (3-glycidyloxypropyl)trimethoxysilane. In some embodiments, the alkylsilyl coating of Formula I is bis(trichlorosilyl)ethane or bis(trimethoxysilyl)ethane and the alkylsilyl coating of Formula II is (3-glycidyloxypropyl)trimethoxysilane followed by hydrolysis. The alkylsilyl coating of Formula I can be bis(trichlorosilyl)ethane or bis(trimethoxysilyl)ethane and the alkylsilyl coating of Formula II can be n-decyltrichlorosilane. In some embodiments, the alkylsilyl coating of Formula I is bis(trichlorosilyl)ethane or bis(trimethoxysilyl) ethane and the alkylsilyl coating of Formula II is trimethylchlorosilane or trimethyldimethyaminosilane. The alkylsilyl coating of Formula I is bis(trichlorosilyl)ethane or bis(trimethoxysilyl)ethane and the alkylsilyl coating of Formula II is methoxy-polyethyleneoxy(3)silane.

In some embodiments, the chromatographic column also includes a alkylsilyl coating having the Formula III in direct contact with the alkylsilyl coating of Formula I. The alkylsilyl coating of Formula III is:

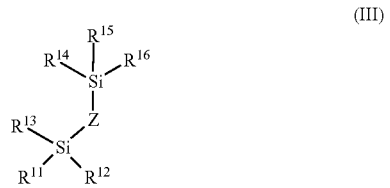

(III)

R$^{11}$, R$^{12}$, R$^{13}$, R$^{14}$, R$^{15}$, and R$^{16}$ are each independently selected from (C$_1$-C$_6$)alkoxy, —NH(C$_1$-C$_6$)alkyl, —N((C$_1$-C$_6$)alkyl)$_2$, OH, and halo. Z is (C$_1$-C$_{20}$)alkyl, —O[(CH$_2$)$_2$O]$_{1-20}$—, —(C$_1$-C$_{10}$)[NH(CO)NH(C$_1$-C$_{10}$)]$_{1-20}$—, or —(C$_1$-C$_{10}$)[alkylphenyl(C$_1$-C$_{10}$)alkyl]$_{1-20}$-.

In some embodiments, the alkylsilyl coating of Formula III is bis(trichlorosilyl)ethane or bis(trimethoxysilyl)ethane. The alkylsilyl coating of Formula I can be bis(trichlorosilyl) ethane or bis(trimethoxysilyl)ethane and the alkylsilyl coating of Formula III can be bis(trichlorosilyl)ethane or bis (trimethoxysilyl)ethane.

In another aspect, the technology features an assembly for a chromatographic system. The assembly includes tubing and a ferrule. The tubing has a first end, a second end and an interior surface coated with an alkylsilyl coating. The ferrule is comprised of a plastic or elastomeric material having a first end, a second end and an opening formed therein from the first end to the second end. The ferrule is positioned at the first end of the tubing with the tubing positioned in the opening of the ferrule. The ferrule has a surface coated with the alkylsilyl coating.

In some embodiments, the alkylsilyl coating is undamaged when the assembly is connected to a chromatographic component. The chromatographic component can be an injection needle, a sample loop, pre-heater tube, or a detector flow cell component.

In some embodiments, the the ferrule has a compressive modulus of less than about 1,400,00 psi. The ferrule can have a hardness less than about 120 Rockwell M. In some embodiments, the ferrule has a dynamic friction coefficient against steel of less than about 0.35. The ferrule can be a polyetheretherketone ring.

In some embodiments, the alkylsilyl coating has the Formula I:

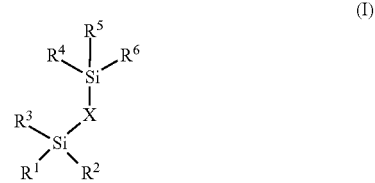

(I)

R$^1$, R$^2$, R$^3$, R$^4$, R$^5$, and R$^6$ are each independently selected from (C$_1$-C$_6$)alkoxy, —NH(C$_1$-C$_6$)alkyl, —N((C$_1$-C$_6$)alkyl)$_2$, OH, OR$^A$, and halo. R$^A$ represents a point of attachment to the interior surfaces of the fluidic system. At least one of R$^1$, R$^2$, R$^3$, R$^4$, R$^5$, and R$^6$ is OR$^A$. X is (C$_1$-C$_{20}$)alkyl, —O[(CH$_2$)$_2$O]$_{1-20}$—, —(C$_1$-C$_{10}$)[NH(CO)NH(C$_1$-C$_{10}$)]$_{1-20}$—, or —(C$_1$-C$_{10}$) [alkylphenyl(C$_1$-C$_{10}$)alkyl]$_{1-20}$-.

In some embodiments, X is (C$_2$-C$_{10}$)alkyl. X can be ethyl. In some embodiments, R$^1$, R$^2$, R$^3$, R$^4$, R$^5$, and R$^6$ are each methoxy or chloro. The alkylsilyl coating of Formula I can be bis(trichlorosilyl)ethane or bis(trimethoxysilyl)ethane In some embodiments, the assembly also includes a second alkylsilyl coating in direct contact with the alkylsilyl coating of Formula I. The second alkylsilyl coating has the Formula II:

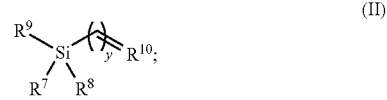

(II)

R$^7$, R$^8$, and R$^9$ are each independently selected from —NH(C$_1$-C$_6$)alkyl, —N[(C$_1$-C$_6$)alkyl]2, (C$_1$-C$_6$)alkoxy, (C$_1$-C$_6$) alkyl, (C$_1$-C$_6$)alkenyl, OH, and halo. R$^{10}$ is selected from (C$_1$-C$_6$)alkyl, —OR$^B$, —[O(C$_1$-C$_3$)alkyl]$_{1-10}$O(C$_1$-C$_6$)alkyl, and phenyl. The (C$_1$-C$_6$)alkyl is optionally substituted with one or more halo. The phenyl is optionally substituted with one or more groups selected from (C$_1$-C$_3$)alkyl, hydroxyl, fluorine, chlorine, bromine, cyano, —C(O)NH$_2$, and carboxyl. R$^B$ is —(C$_1$-C$_3$)alkyloxirane, —(C$_1$-C$_3$)alkyl-3,4-epoxycyclohexyl, or —(C$_1$-C$_4$)alkylOH. The hashed bond to R$^{10}$ represents an optional additional covalent bond between R$^{10}$ and the carbon bridging the silyl group to form an alkene, provided y is not 0. y is an integer from 0 to 20.

In some embodiments, y is an integer from 2 to 9. In some embodiments, y is 9, R$^{10}$ is methyl, and R$^7$, R$^8$, and R$^9$ are each methoxy, ethoxy or chloro. The alkylsilyl coating of Formula II can be (3-glycidyloxypropyl)trimethoxysilane, n-decyltrichlorosilane, trimethylchlorosilane, trimethyldimethyaminosilane, or methoxy-polyethyleneoxy(1-10)silane.

In some embodiments, the alkylsilyl coating of Formula II is (3-glycidyloxypropyl)trimethoxysilane followed by hydrolysis.

The alkylsilyl coating of Formula I can be bis(trichlorosilyl)ethane or bis(trimethoxysilyl)ethane and the alkylsilyl coating of Formula II can be (3-glycidyloxypropyl) trimethoxysilane. In some embodiments, the alkylsilyl coating of Formula I is bis(trichlorosilyl)ethane or bis (trimethoxysilyl)ethane and the alkylsilyl coating of Formula II is (3-glycidyloxypropyl)trimethoxysilane followed by hydrolysis. The alkylsilyl coating of Formula I can be bis(trichlorosilyl)ethane or bis(trimethoxysilyl)ethane and the alkylsilyl coating of Formula II can be n-decyltrichlorosilane. In some embodiments, the alkylsilyl coating of Formula I is bis(trichlorosilyl)ethane or bis(trimethoxysilyl)ethane and the alkylsilyl coating of Formula II is trimethylchlorosilane or trimethyldimethyaminosilane. The alkylsilyl coating of Formula I can be bis(trichlorosilyl) ethane or bis(trimethoxysilyl)ethane and the alkylsilyl coating of Formula II can be methoxy-polyethyleneoxy(3)silane.

In some embodiments, the assembly also includes an alkylsilyl coating having the Formula III in direct contact with the alkylsilyl coating of Formula I. The alkylsilyl coating of Formula III is:

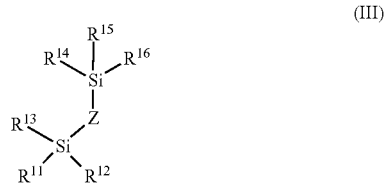

(III)

$R^{11}$, $R^{12}$, $R^{13}$, $R^{14}$, $R^{15}$, and $R^{16}$ are each independently selected from $(C_1-C_6)$alkoxy, $-NH(C_1-C_6)$alkyl, $-N((C_1-C_6)$alkyl$)_2$, OH, and halo. Z is $(C_1-C_{20})$alkyl, $-O[(CH_2)_2O]_{1-20}-$, $-(C_1-C_{10})[NH(CO)NH(C_1-C_{10})]_{1-20}-$, or $-(C_1-C_{10})[alkylphenyl(C_1-C_{10})alkyl]_{1-20}-$.

In some embodiments, the alkylsilyl coating of Formula III is bis(trichlorosilyl)ethane or bis(trimethoxysilyl)ethane. The alkylsilyl coating of Formula I can be bis(trichlorosilyl) ethane or bis(trimethoxysilyl)ethane and the alkylsilyl coating of Formula III can be bis(trichlorosilyl)ethane or bis (trimethoxysilyl)ethane.

In another aspect, the technology features a connector for a chromatography system. The connector includes an element comprised of a plastic or elastomeric material configured to connect two components of a chromatography system. The element has an alkylsilyl coating on at least one surface. The alkylsilyl coating is undamaged when the two components of the chromatography system are connected with the element.

In some embodiments, the element is a face seal. In some embodiments, the element is a ferrule.

BRIEF DESCRIPTION OF THE DRAWINGS

The technology will be more fully understood from the following detailed description taken in conjunction with the accompanying drawings, in which:

FIG. 7 is a chart showing exemplary embodiments of active coatings, in accordance with an illustrative embodiment of the technology.

FIG. 8A is a chromatogram showing a 2.1×50 BEH C18 column having C2C3 coated standard (i.e., metal on metal construction) endcap used for an extraction of the ion of T43pp on injection 20, in accordance with an illustrative embodiment of the technology.

FIG. 8B is a chromatogram showing a 2.1×50 BEH C18 column having C2C3 coated softseal endcap used for an extraction of the ion of T43pp on injection 20, in accordance with an illustrative embodiment of the technology.

FIG. 9A is a chromatogram showing a 2.1×50 CSH (charged surface hybrid) C18 column using C2C3 coated soft seal hardware at injection four for an extraction of the ion of T19p and T43pp, in accordance with an illustrative embodiment of the technology.

FIG. 9B is a chromatogram showing a 2.1×50 CSH (charged surface hybrid) C18 column uncoated soft seal hardware at injection four for an extraction of the ion of T19p and T43pp, in accordance with an illustrative embodiment of the technology.

FIG. 9C is a chromatogram showing a Phenomenex bioZen C18 column using metal on meal seals with Ti hardware at injection four for an extraction of the ion of T19p and T43pp, in accordance with an illustrative embodiment of the technology.

DETAILED DESCRIPTION

It is critical in liquid chromatography for flow paths and their chemical properties to be given serious consideration. In particular, there is a need to minimize the loss of analytes to chromatographic flow paths. It has become routine for liquid chromatography (LC) analysts to encounter egregious sample losses. For this problem, thin film coatings can be used to tailor the chemical properties of a flow path component. Moreover, a coated soft seal fitting or connector, for example, a seal or connector made of plastic or elastomeric material, can be used in the assembly of the chromatographic system. With this careful combination of chemical and physical considerations, low sample loss flow paths can be achieved.

Coatings suitable for achieving these chromatographic effects can be constructed by numerous means. Organosilica (alkylsilyl) is a versatile composition to use in the coating of both metallic and polymeric flow path components, which can range from an injector needle and pre-column heater to post-column tubing, column housings, frits, detector flow cells, and electrospray needles. The organosilica (alkyksilyl) coating can be applied via either gas phase or solution phase reactions and with a host of different silanizing reagents. For example, an alkylsilyl coating can be applied via vapor deposition.

In general, a number of aspects of the technology are directed to (1) filters, seals, and/or connectors having an alkylsilyl coating; (2) chromatographic columns including filters, seals, and/or connectors having an alkylsilyl coating; (3) coated assemblies and connectors for chromatographic systems; (4) methods of isolating an analyte in a sample, in particular a metal-interacting analyte; and (5) kits comprising various chromatographic components coated with an alkylsilyl coating and instructions for use.

Devices

Figure 1:
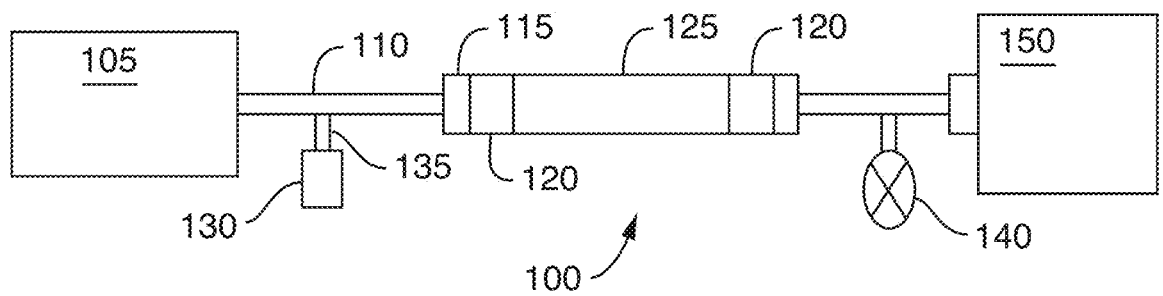
FIG. 1 is a schematic of a chromatographic flow system including a chromatography column and various other components, in accordance with an illustrative embodiment of the technology. A fluid is carried through the chromatographic flow system with a fluidic flow path extending from a fluid manager to a detector.

FIG. 1 is a representative schematic of a chromatographic flow system/device 100 that can be used to separate analytes in a sample. Chromatographic flow system 100 includes several components including a fluid manager system 105 (e.g., controls mobile phase flow through the system), tubing 110 (which could also be replaced or used together with microfabricated fluid conduits), fluid connectors 115 (e.g., fluidic caps), frits 120, a chromatography column 125, a sample injector 135 including a sample injection needle (not shown) to insert or inject the sample into the mobile phase, a vial, sinker, or sample reservoir 130 for holding the sample prior to injection, a detector 150 located downstream of the chromatography column 125, and a pressure regulator 140 for controlling pressure of the flow. The system 100 can also include a sample loop (not shown) and a pre-heater tube (not shown) located before the chromatography column 125. The detector 150 can include a detector flow cell component (not shown). The sample reservoir 130 is in fluid communication with the sample injection needle. Interior surfaces of the components of the chromatographic system/device form a fluidic flow path that has wetted surfaces. The fluidic flow path can have a length to diameter ratio of at least 20, at least 25, at least 30, at least 35 or at least 40.

The fluidic flow path can include the detector 150. The detector 150, can be a mass spectrometer. The fluidic flow path can include wetted surfaces of an electrospray needle (not shown).

Portions or all of the wetted surfaces of the fluidic flow path can be coated with an alkylsilyl coating, described in detail herein. The alkylsilyl coating can be inert to the analytes in a sample or the alkylsilyl coating can be an active coating, selected to interact with the analyte(s) in the sample to improve the separation of the analyte(s). In some embodiments, the active coating interacts with the mobile phase to improve separation of the analyte(s).

The alkylsilyl coating can be provided throughout the system from the tubing or fluid conduits 110 extending from the fluid manager system 105 all the way through to the detector 150. The coatings can also be applied to portions of the fluidic fluid path. That is, one may choose to coat one or more components or portions of a component and not the entire fluidic path. For example, the internal portions of the column 125 and its frits 120 and end caps 115 can be coated whereas the remainder of the flow path can be left unmodified. Further, removable/replaceable components can be coated. For example, the vial or sinker 130 containing the sample reservoir can be coated as well as frits 120.

In some embodiments, one or both frits 120 have a wetted surface that is coated with one of the alkylsilyl coatings described in detail herein. A frit 120 can be positioned at the inlet or outlet of the column 125. In some embodiments, the frit 120 is a filter. In some embodiments, the column 125 has a frit 120 positioned at both the inlet and outlet of the column 125. In some embodiments, the chromatographic column 125 can be designed such that the inlet and/or outlet frit 120 is replaceable. In this way, if the frit 120 is coated with an alkyl silyl coating described herein, the frit 120 can be easily replaced with a frit having a different alkyl silyl coating to achieve a different effect.

In one aspect, the flow path of the fluidic systems described herein is defined at least in part by an interior surface of tubing. In another aspect, the flow path of the fluidic systems described herein is defined at least in part by an interior surface of microfabricated fluid conduits. In another aspect, the flow path of the fluidic systems described herein is defined at least in part by an interior surface of a column. In another aspect, the flow path of the fluidic systems described herein is defined at least in part by passageways through a frit. In another aspect, the flow path of the fluidic systems described herein is defined at least in part by an interior surface of a sample injection needle. In another aspect, the flow path of the fluidic systems described herein extends from the interior surface of a sample injection needle throughout the interior surface of a column. In another aspect, the flow path extends from a sample reservoir container (e.g. sinker) disposed upstream of and in fluidic communication with the interior surface of a sample injection needle throughout the fluidic system to a connector/port to a detector.

Seals/Connectors

Figure 2A:
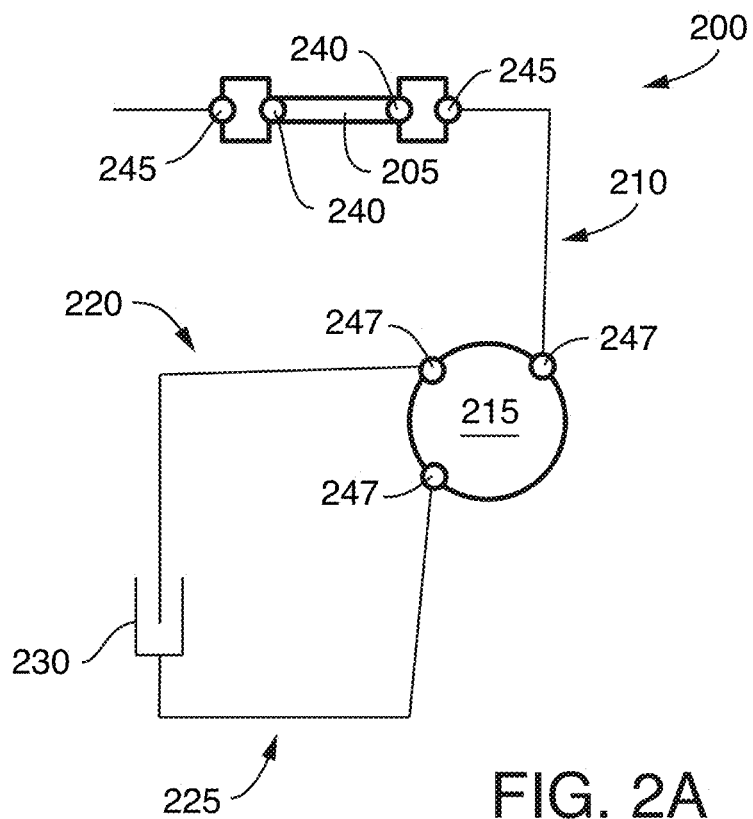
FIG. 2A is a schematic of a portion of a chromatographic flow path having a flow through needle injection system showing connections where a soft seal can be used, in accordance with an illustrative embodiment of the technology.
Figure 2B:
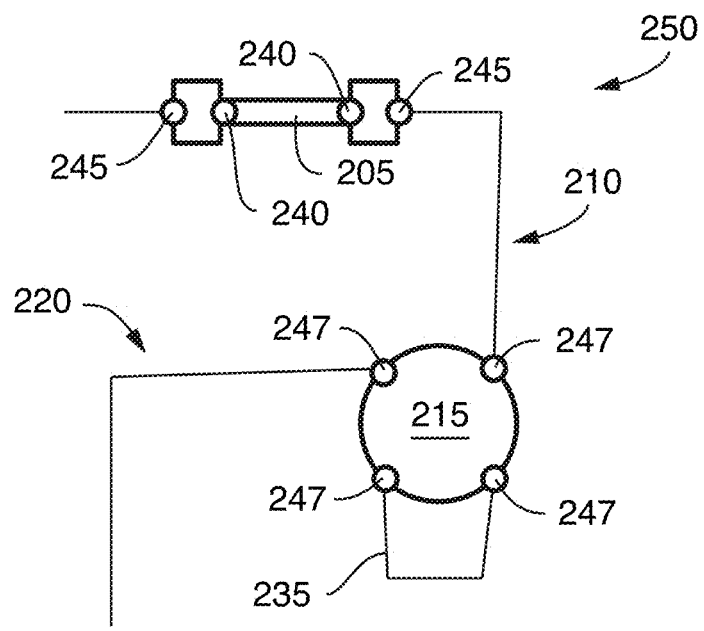
FIG. 2B is a schematic of a portion of a chromatographic flow path having a fixed loop injection system showing connections where a soft seal can be used, in accordance with an illustrative embodiment of the technology.

FIG. 2A shows a flow through needle injection system 200 for a liquid chromatography system (e.g., the chromatography system of FIG. 1). FIG. 2B shows a fixed loop injection system 250 for a liquid chromatography system (e.g., the chromatography system of FIG. 1). Each injection system includes a column 205, pre-heater tubing 210, an injection valve 215, and a needle 220. FIG. 2A further shows a needle seat and tube 225 and a sample reservoir 230. FIG. 2B further shows a sample loop 235.

FIGS. 2A and 2B also show the location of various connections between chromatographic components as well as internal column connections. For example, the chromatography column 205 has two internal column connections 240 at the inlet and outlet of the column 205 (e.g., the frits 120 of FIG. 1). The column 205 also has two external connections 245 that connect the column 205 to other chromatographic components, for example, pre-heater tubing 210. In addition, the injection valve 215 has several connectors 247 to connect various chromatographic components. FIGS. 2A and 2B represent a portion of the chromatographic flow path. Other portions of the flow path can include other valves or connections between chromatographic components where a connection utilizing the technology described herein can be beneficial.

Traditionally, chromatography columns are sealed with a metal on metal gasket or filter housing type of approach. The metals are crushed into one another in order to sufficiently fill any gaps and to raise the gasket stress above that of operating pressure. While this approach is highly successful at preventing leaks, it causes damage to the components themselves and any surface coatings, such as the alkylsilyl coatings described herein, that may be applied to the chromatography column, tubing, or connector assembly itself. Incorporating a soft seal design for the connector assembly prevents damage to the alkylsilyl coating (and underlying chromatographic components), which can be detrimental to chromatographic performance and/or column lifetimes. By using appropriate seal material and sufficiently encapsulating the seal material in the as torqued state, the soft seal design can be used even in high pressure chromatographic separations.

Figure 3:
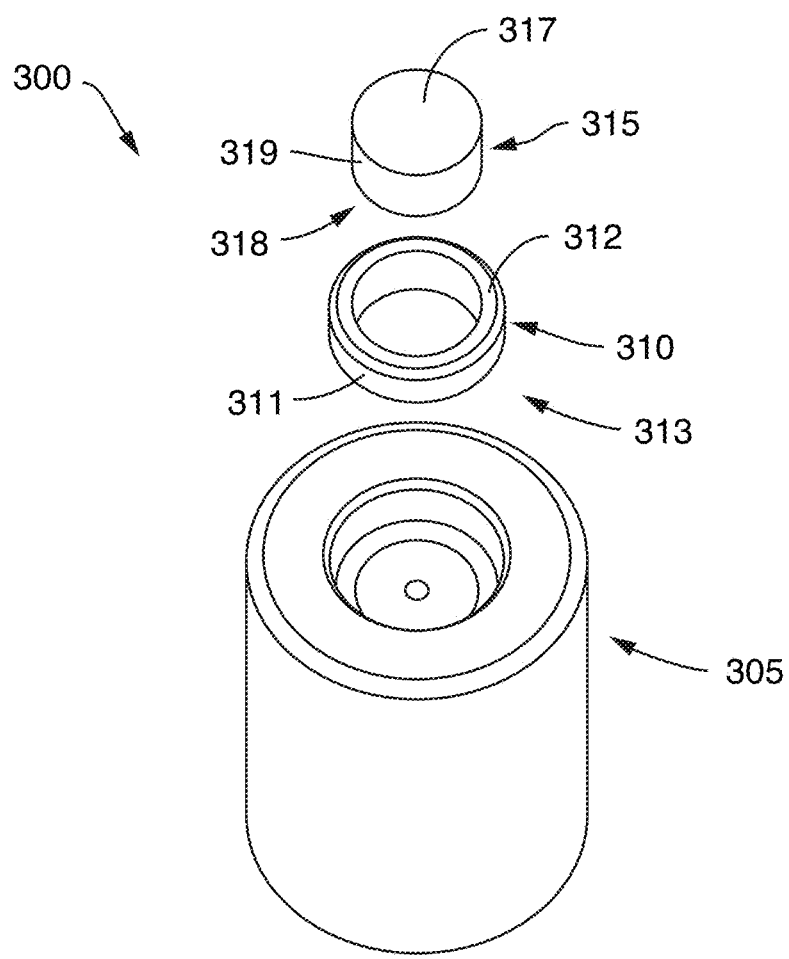
FIG. 3 is an isometric view of a porous element, compression element, and housing according to an illustrative embodiment of the technology.

FIG. 3 shows a filter device 300 for use with chromatography columns, for example, for use as an internal column connection 240 of FIGS. 2A and 2B or frit 120 of FIG. 1. The filter device 300 includes a housing 305, a compression element 310, and a porous element 315. The housing 305, compression element 310 and porous element 315 are adapted or configured to be assembled to form the filter device 300. In some embodiments, the filter device 300 can be coupled to or disposed in a chromatographic column. Details of the filter device can be found in International Publication No. WO 2014/197783, the entire contents of which is incorporated herein by reference.

At least a portion of the porous element 315 is coated with an alkylsilyl coating, as described in detail herein. For example, the porous element 315 has an upper surface 317 and a lower surface 318. The porous element 315 has a circumferential side wall 319 intersecting the upper surface 317 and the lower surface 318. Any or all of these surfaces can be coated with the alkylsilyl coating.

The porous element 315 can be a frit. In some embodiments, the porous element 315 is a polyetheretherketone ring. The porous element 315 can have a porous structure including a plurality of void spaces. Porous elements of different grades, or nominal particle retention ratings, are commercially available. Such porous elements can be designed for use in an HPLC column or other liquid or gas chromatography applications. Those skilled in the art will recognize that porous support structures are also known as chromatographic frits or filters. As used herein, the term "porous element" refers to any of a number of porous elements, e.g., chromatographic frits or filters, which preferably have grades or particle retention ratings suitable for use in HPLC, either in chromatographic columns or as in-line filters. These porous support structures typically have nominal porosity and pore size grades, and are capable of retaining particles smaller than about 2.5 microns in diameter. Porous elements that are suitable for making frits according to the technology include porous sintered stainless steel porous elements with grade ranging from about 0.1 micron to about 10 micron, for example, 0.5 micron grade and 2.0 micron grade stainless steel porous support structures. The porous element can be made from particles that are compacted and sintered according to techniques known in the art, thereby producing structures with specified grades. The porous element can be made of any material suitable for producing a sintered porous element, such as titanium, stainless steel, PEEK, polyamide, polyolefin, or PTFE. The entirety of the porous element 315 can be coated with the alkylsilyl coating described herein, including the surfaces that form the pores and/or void spaces of the porous element 315.

The compression element 310 is configured to receive the porous element thereby forming an assembly. The compression element 310 has a generally cylindrical body 311, with an upper surface 312 and a lower surface 313. The compression element has an inner circumferential surface and an outer circumferential surface. Any or all of these surfaces can be coated with the alkylsilyl coating. The upper surface 312 of the compression element 310 can provide a sealing surface when the assembly is retained within the housing.

The compression element 310 can receive the porous element in a slip-fit relationship. For example, the sidewall 319 of the porous element 315 can engage the inner circumferential surface of the compression element 315 in a slip-fit relationship.

The compression element 310 can be made of any material softer than the material of the housing 305. The compression element 310 can be a plastic or elastomeric material. Chromatographically appropriate plastic examples include, but are not limited to, polyoxymethylene (also known as acetal), chlorotrifluoroethylene (CTFE), fluorinated ethylene propylene (FEP), high density polyethylene (HDPE), poly(p-phenylene oxide) PPO, (polyetheretherketone) PEEK, perfluoroalkoxy (PFA), polypropylene, polyphenylene sulfide (PPS), polytetrafluoroethylene (PTFE), polyvinylidene fluoride (PVDF), ultra-high-molecular-weight polyethylene (UHMWPE), and polyimide (PI, for example, Vespel®, commercially available from E.I.du Pont de Nemours and Company). Chromatographically appropriate elastomers include, but are not limited to Aflas® (a fluoroelastomer based upon an alternating, copolymer of tetrafluoroethylene and propylene, commercially available from AGC Group (formerly known as Asahi Glass Co., Ltd.), Japan), ethylene propylene rubber (EPM), ethylene propylene diene monomer (EPDM), FEP, FKM fluoroelastomer (for example, Viton® commercially available from The Chemours Co., Wilmington, DE), FFKM fluoroelastomer (for example, Kalrez® commercially available from E.I. du Pont de Nemours and Company), and fluorosilicone.

In quantitative terms, the compression element 310 has a compressive modulus of less than 1,400,000 psi, a hardness less than 120 Rockwell M, and a dynamic friction coefficient against steel of less than 0.35. In some embodiments, the compression element 310 has a compressive modulus of less than 700,000 psi, a hardness less than 100 Rockwell M, and a dynamic friction coefficient against steel of less than or equal to 0.3. In some embodiments, the compression element 310 does not meet the friction coefficient limitation.

In some embodiments the compression element 310 and the housing 305 are made of different materials. In other embodiments, the compression element 310 and the housing 305 are made of the same material. When the compression element 310 and the housing 305 are made of the same material, the hardness of the material used for the compression element 310 is selected to be less than the hardness of the material used for the house 305. For example, the housing 305 and the compression element 310 can be made from different grades of the same material.

The housing 305 has an opening formed therein. The opening is configured to receive the assembly. The assembly is retained within the opening when the assembly is received therein. When the assembly is disposed within the opening of the housing, the compression element can be deformed slightly. The deformation of the compression element can cause a corresponding reduction in diameter of the inner circumferential surface. The reduction in diameter of the inner circumferential surface can cause a radial compressive force to be applied to the circumferential sidewall 319 of the porous element 317. The compressive force between the inner circumferential surface of the compression element and the circumferential sidewall of the porous element can retain the porous element within the compression element. This force can be sufficient to train the porous element therein without damage to the porous element.

In some embodiments the porous element can be retained within the compression element by frictional engagement between the inner circumferential sidewall of the compression element and the circumferential sidewall of the porous element. In some embodiments, the porous element can be retained within the compression element by deformation of the inner circumferential sidewall of the compression element around the circumferential sidewall of the porous element.

In some embodiments, the compression element and/or housing have surfaces that are coated with the alkylsilyl coating. In some embodiments, all surfaces of the porous element, the compression element and the housing are coated with an alkylsilyl coating. In some embodiments, only surfaces that contact the analyte (e.g., wetted surfaces, internal surfaces) are coated with an alkylsilyl coating.

Figure 4:
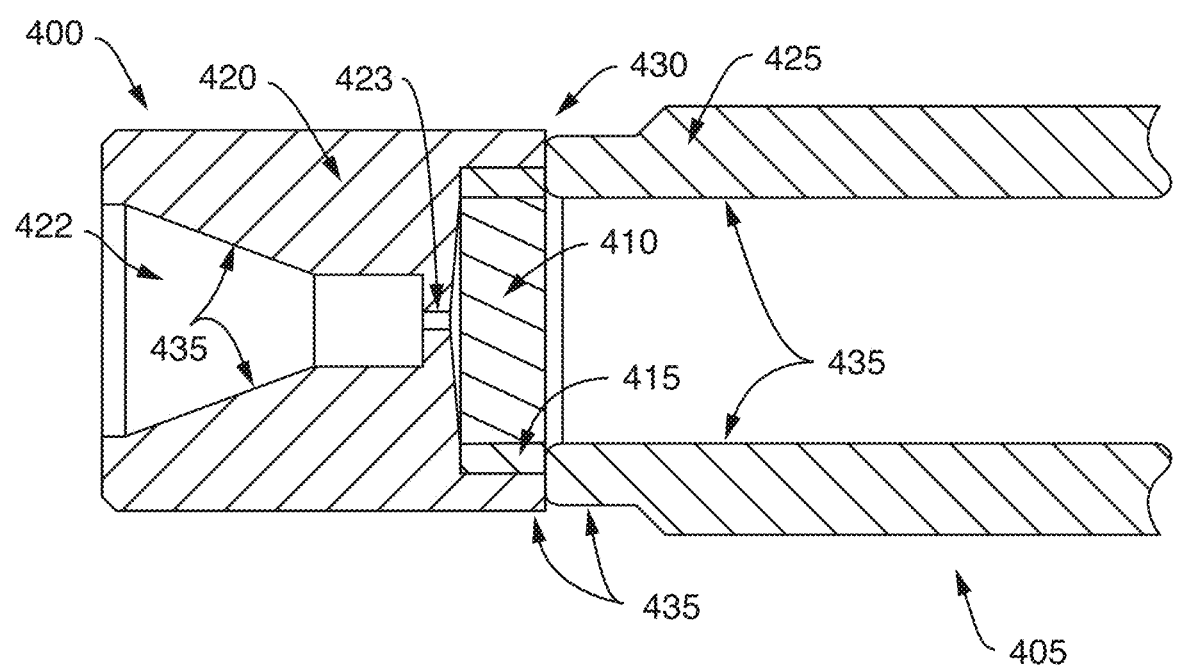
FIG. 4 is a cross-sectional view of a filter connected to a chromatographic column, according to an illustrative embodiment of the technology.

FIG. 4 shows an example of a filter 400 (e.g., filter device 300 of FIG. 3) connected to a column 405. The filter 400 includes a porous element or frit 410, a compression element 415 and a housing 420. The filter 400 also includes a sealing cone 422 and a through hole 423. The column 405 includes a column body 425 having a first end 430 and a second end (not shown) and an interior surface. As can be seen in FIG. 4, the compression element 415 is in contact with the first end 430 of the column 405. An alkylsilyl coating 435 can be applied to any interior or exterior surface of the filter 400 and/or column 405. For example, the coating 435 can applied to interior surfaces of the sealing cone 422, interior surfaces of the through hole 423, along all surfaces of the porous element or frit 410 and all surfaces of the compression element 415. Notably, the alkylsilyl coating is applied to surfaces of the compression element 415 and housing 420 that come into contact with the first end 430 of the column 405. The soft seal design of the filter 400, i.e., the compression element 415, maintains the integrity of the alkylsilyl coating (i.e., the alkylsilyl coating is not damaged) when in contact with/sealed against the column 405.

In addition, interior surfaces of the column body 425 and external surfaces at the first end 430 of the column 405 can be coated with the coating 435. The soft seal design of the filter 400, i.e., the compression element 415, maintains the integrity of the alkylsilyl coating (i.e., the alkylsilyl coating is not damaged) on all surfaces (i.e., surfaces of the filter 400 and column 405) when in contact with/sealed against the column 405.

Although FIG. 4 shows only one end of a chromatographic column, the filter can be positioned at either end (i.e., the inlet or outlet of the column) or both ends of the chromatographic column.

Figure 5:
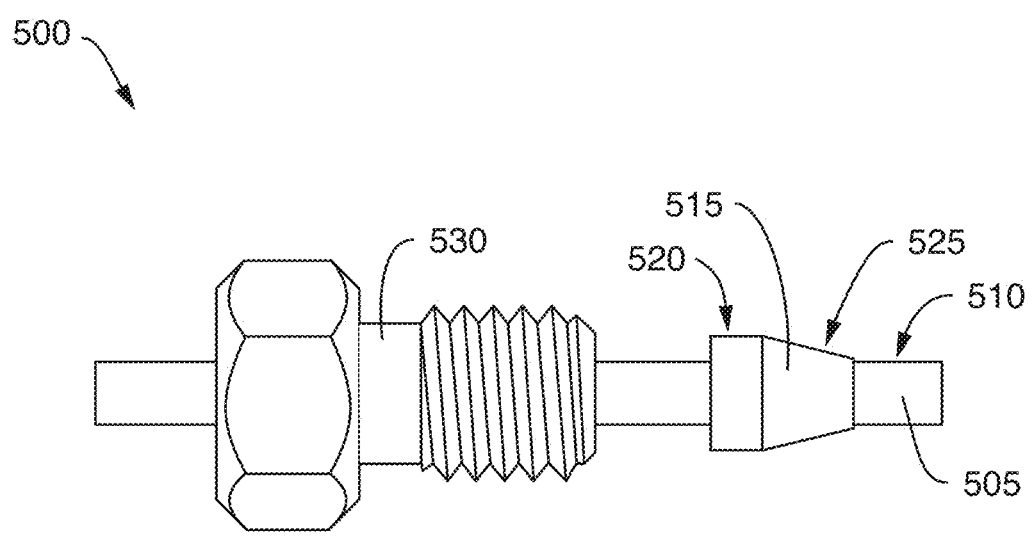
FIG. 5 is a schematic of an assembly for a chromatographic system including tubing and a ferrule, according to an illustrative embodiment of the technology.

Referring back to FIG. 2, a chromatographic system includes many other connection points in addition to the internal column connection 240. The column 205 also has two external connections 245 that connect the column 205 to other chromatographic components, for example, pre-heater tubing 210. In addition, the injection valve 215 has several connectors 247 to connect various chromatographic components. These other connections (column external connections and connecting other chromatographic components) can also benefit from a soft seal design, which can be different from that of the filter shown in FIGS. 3 and 4. For example, FIG. 5 shows an assembly 500 for a chromatographic system that can be used as the external connection for a chromatographic column and/or to connect other chromatographic components. The assembly 500, includes tubing 505 having a first end 510, a second end (not shown) and an interior surface (not shown) coated with an alkylsilyl coating. The assembly 500 also includes a ferrule 515 that is comprised of a plastic or elastomeric material. The ferrule 515 has a first end 520 and a second end 525. An opening is formed in the ferrule 515 form the first end 520 to the second end 525. The ferrule 515 is positioned at the first end 510 of the tubing 505 with the tubing 505 positioned in the opening of the ferrule 515. The ferrule 515 has at least one surface that is coated with an alkylsilyl coating. For example, all surfaces (internal and external) of the ferrule 515 can be coated with the alkylsilyl coating.

The alkylsilyl coating remains undamaged when the assembly 500 is connected to a chromatographic component, for example, by using the nut 530. The chromatographic component can be an injection needed, a sample loop, a pre-heater tube, or a detector flow cell component. The ferrule can be made out of the materials described above in relation to the compression element 310. Similar to compression element 310, ferrule 515 can have a compressive modulus of less than 1,400,000 psi, a hardness less than 120 Rockwell M, and a dynamic friction coefficient against steel of less than 0.35. In some embodiments, the ferrule 515 has a compressive modulus of less than 700,000 psi, a hardness less than 100 Rockwell M, and a dynamic friction coefficient against steel of less than or equal to 0.3. In some embodiments, the ferrule 515 does not meet the friction coefficient limitation. In some embodiments the ferrule is a PEEK ring.

Figure 6:
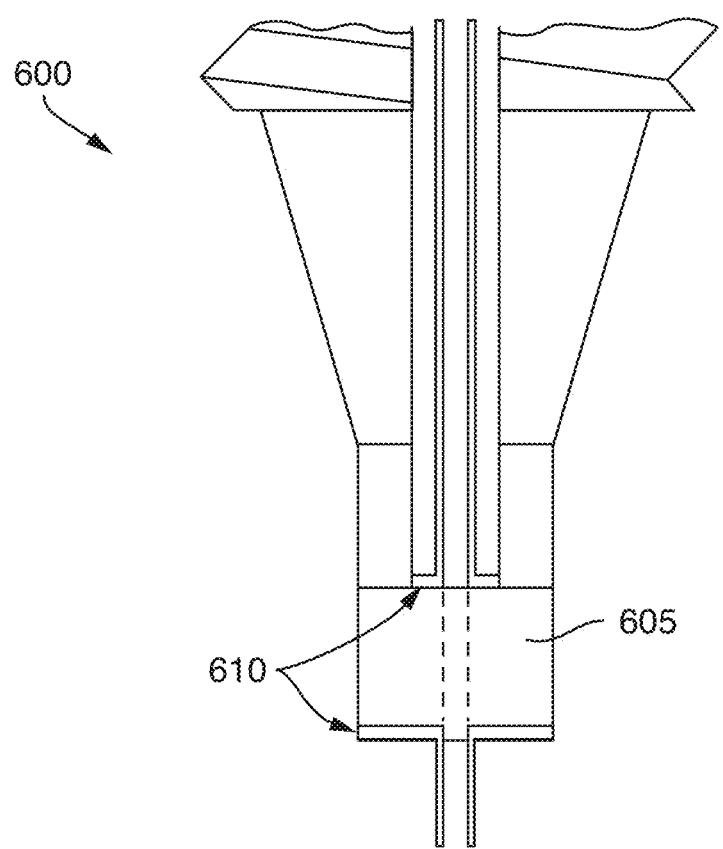
FIG. 6 is a schematic of a connector configured to connect two component of a chromatography system, according an illustrative embodiment of the technology.

FIG. 6 shows a connector 600 for a chromatography system that can be used as the external connection for a chromatographic column and/or to connect other chromatographic components. The connector 600 includes an element 605 comprised for a plastic of elastomeric material configured to connect two components of a chromatography system. The element 605 can be made out of the materials described above in relation to the compression element 310. Similar to compression element 310, element 605 can have a compressive modulus of less than 1,400,000 psi, a hardness less than 120 Rockwell M, and a dynamic friction coefficient against steel of less than 0.35. In some embodiments, the element 605 has a compressive modulus of less than 700,000 psi, a hardness less than 100 Rockwell M, and a dynamic friction coefficient against steel of less than or equal to 0.3. In some embodiments, the element 605 does not meet the friction coefficient limitation. In some embodiments the ferrule is a PEEK ring.

The element 605 has an alkylsilyl coating 610 (as described herein) on at least one surface. The coating 610 is undamaged when the two components of the chromatography system are connected with the element 610. The element 610 can be a face seal or a ferrule.

Coatings

The technology relates to the combination of the soft seal connectors, assemblies and filters described above, with thin film coatings (e.g., alkylsilyl coatings) which can be applied either entirely or partially over flow path surfaces, most particularly to those that come into contact with an analyte in a sample and those that are constituents of an LC instrument or chromatographic column. In some embodiments, external surfaces of the connector, assembly and/or filter are also coated along with the external ends of a column. Exemplary alkylsilyl coatings that can be used include bio-inert coatings, for example, those described in U.S. patent application Ser. No. 16/133,089 filed on Sep. 17, 2018, the entire contents of which is incorporated herein by reference. In addition, active coatings (coatings that interact with the analyte or mobile phase) can also be used. A soft seal design provides for optimal use of these alkylsilyl coatings because it ensures that the potentially friable surface imparted by a coating is left uncompromised at the time a column is assembled or an LC part, like a transfer line, is wrenched together. Examples of soft seal fitting include MarvelX® connections (commercially available from IDEX Health & Science LLC, Oak Harbor, Washington) or ZenFit® tubing connectors (commercially available from Waters Technologies Corporation, Milford, MA).

Inert Coatings

In some aspects, the alkylsily coating is used to modify a flow path to address flow path interactions with an analyte. That is, the alkylsilyl coating can be a bioinert, low-bind coating, which minimizes surface reactions with the metal interacting analyte and allows the analyte to pass along a flow path without clogging, attaching to surfaces, or change in analyte properties. The reduction/elimination of these interactions is advantageous because it allows for accurate quantification and analysis of a sample containing a metal-interacting analyte, for example biomolecules, proteins, glycans, peptides, oligonucleotides, pesticides, bisphosphonic acids, anionic metabolites, and zwitterions like amino acids and neurotransmitters. The soft seal connector/assembly/filters described above, ensure that the alkylsilyl coating is not damaged when a coated chromatographic component is connected to another (coated or uncoated) chromatographic component, thereby ensuring the reduction/elimination of unwanted interactions between a substrate and an analyte. The alkylsilyl coating can have the Formula I:

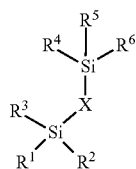

(I)

$R^1$, $R^2$, $R^3$, $R^4$, $R^5$, and $R^6$ are each independently selected from ($C_1$-$C_6$)alkoxy, —NH($C_1$-$C_6$)alkyl, —N(($C_1$-$C_6$)alkyl)$_2$, OH, OR$^A$, and halo. R$^A$ represents a point of attachment to the interior surfaces of the fluidic system. At least one of $R^1$, $R^2$, $R^3$, $R^4$, $R^5$, and $R^6$ is OR$^A$. X is ($C_1$-$C_{20}$)alkyl, —O[($CH_2$)$_2$O]$_{1-20}$—, —($C_1$-$C_{10}$)[NH(CO)NH($C_1$-$C_{10}$)]$_{1-20}$—, or —($C_1$-$C_{10}$)[alkylphenyl($C_1$-$C_{10}$)alkyl]$_{1-20}$-.

In some embodiments, X is ($C_2$-$C_{10}$)alkyl. X can be ethyl. In some embodiments, $R^1$, $R^2$, $R^3$, $R^4$, $R^5$, and $R^6$ are each methoxy or chloro. The alkylsilyl coating of Formula I can be bis(trichlorosilyl)ethane or bis(trimethoxysilyl)ethane In some embodiments, the assembly also includes a second alkylsilyl coating in direct contact with the alkylsilyl coating of Formula I. The second alkylsilyl coating has the Formula II:

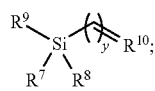

(II)

$R^7$, $R^8$, and $R^9$ are each independently selected from —NH($C_1$-$C_6$)alkyl, —N[($C_1$-$C_6$)alkyl]2, ($C_1$-$C_6$)alkoxy, ($C_1$-$C_6$)alkyl, ($C_1$-$C_6$)alkenyl, OH, and halo. $R^{10}$ is selected from ($C_1$-$C_6$)alkyl, —OR$^B$, —[O($C_1$-$C_3$)alkyl]$_{1-10}$O($C_1$-$C_6$)alkyl, and phenyl. The ($C_1$-$C_6$)alkyl is optionally substituted with one or more halo. The phenyl is optionally substituted with one or more groups selected from ($C_1$-$C_3$)alkyl, hydroxyl, fluorine, chlorine, bromine, cyano, —C(O)NH$_2$, and carboxyl. $R^B$ is —($C_1$-$C_3$)alkyloxirane, —($C_1$-$C_3$)alkyl-3,4-epoxycyclohexyl, or —($C_1$-$C_4$)alkylOH. The hashed bond to $R^{10}$ represents an optional additional covalent bond between $R^{10}$ and the carbon bridging the silyl group to form an alkene, provided y is not 0. y is an integer from 0 to 20.

In some embodiments, y is an integer from 2 to 9. In some embodiments, y is 9, $R^{10}$ is methyl, and $R^7$, $R^8$, and $R^9$ are each methoxy, ethoxy or chloro. The alkylsilyl coating of Formula II can be (3-glycidyloxypropyl)trimethoxysilane, n-decyltrichlorosilane, trimethylchlorosilane, trimethyldimethyaminosilane, or methoxy-polyethyleneoxy(1-10)silane. In some embodiments, the alkylsilyl coating of Formula II is (3-glycidyloxypropyl)trimethoxysilane followed by hydrolysis.

The alkylsilyl coating of Formula I can be bis(trichlorosilyl)ethane or bis(trimethoxysilyl)ethane and the alkylsilyl coating of Formula II can be (3-glycidyloxypropyl)trimethoxysilane. In some embodiments, the alkylsilyl coating of Formula I is bis(trichlorosilyl)ethane or bis(trimethoxysilyl)ethane and the alkylsilyl coating of Formula II is (3-glycidyloxypropyl)trimethoxysilane followed by hydrolysis. The alkylsilyl coating of Formula I can be bis(trichlorosilyl)ethane or bis(trimethoxysilyl)ethane and the alkylsilyl coating of Formula II can be n-decyltrichlorosilane. In some embodiments, the alkylsilyl coating of Formula I is bis(trichlorosilyl)ethane or bis(trimethoxysilyl)ethane and the alkylsilyl coating of Formula II is trimethylchlorosilane or trimethyldimethyaminosilane. The alkylsilyl coating of Formula I can be bis(trichlorosilyl)ethane or bis(trimethoxysilyl)ethane and the alkylsilyl coating of Formula II can be methoxy-polyethyleneoxy(3)silane.

In some embodiments, the assembly also includes an alkylsilyl coating having the Formula III in direct contact with the alkylsilyl coating of Formula I. The alkylsilyl coating of Formula III is:

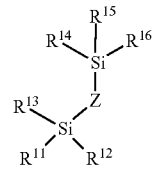

(III)

$R^{11}$, $R^{12}$, $R^{13}$, $R^{14}$, $R^{15}$, and $R^{16}$ are each independently selected from ($C_1$-$C_6$)alkoxy, —NH($C_1$-$C_6$)alkyl, —N(($C_1$-$C_6$)alkyl)$_2$, OH, and halo. Z is ($C_1$-$C_{20}$)alkyl, —O[($CH_2$)$_2$O]$_{1-20}$—, —($C_1$-$C_{10}$)[NH(CO)NH($C_1$-$C_{10}$)]$_{1-20}$—, or —($C_1$-$C_{10}$)[alkylphenyl($C_1$-$C_{10}$)alkyl]$_{1-20}$-.

In some embodiments, the alkylsilyl coating of Formula III is bis(trichlorosilyl)ethane or bis(trimethoxysilyl)ethane. The alkylsilyl coating of Formula I can be bis(trichlorosilyl)ethane or bis(trimethoxysilyl)ethane and the alkylsilyl coating of Formula III can be bis(trichlorosilyl)ethane or bis(trimethoxysilyl)ethane.

In the present technology, vapor deposited alkylsilyl coatings on wetted surfaces of fluidic systems (e.g., liquid chromatography systems) modify the fluidic path and decrease secondary interactions. As such, they are bioinert or low-bind (meaning that analytes of a sample do not interact with the alkylsilyl coating). In addition, the deposited coatings are highly tunable to provide a range of desirable contact angles (e.g., make the wetted surfaces hydrophilic or hydrophobic), chemistries, and properties to achieve a desired effect on the flow path and ultimately the sample passing through the flow path.

The thickness of the alkylsilyl coating can be at least about 100 Å. For example the thickness can be between about 100 Å to about 1600 Å. The thickness of the multi-layered alkylsilyl coating for Formal I can be about 100 Å, 200 Å, 300 Å, 400 Å, 500 Å, 600 Å, 700 Å, 800 Å, 900 Å, 1000 Å, 1100 Å, 1200 Å, 1300 Å, 1400 Å, 1500 Å or 1600 Å.

Exemplary coatings with their respective approximate thickness and contact angle are provided in Table 1.

TABLE 1

| VPD# | Vapor Deposited Material | Alternative Coating Abbreviation | Approximate Thickness of Product | Approximate Contact Angle |
|---|---|---|---|---|
| 1 | bis(trichlorosilyl)ethane or bis(trismethoxysilyl)ethane as a first layer followed by GPTMS followed by hydrolysis to form GPTMS-OH | $C_2$-GPTMS-OH | 500 Å | 15° |
| 2 | bis(trichlorosilyl)ethane or bis(trimethoxysilyl)ethane | $C_2$ | 500 Å | 35° |
| 3 | bis(trichlorosilyl)ethane or bis(trimethoxysilyl)ethane as a first layer followed by bis(trichlorosilyl)ethane or bis(trimethoxysilyl)ethane as a second layer. | $C_2$-$C_2$ | 1600 Å | 35° |
| 4 | bis(trichlorosilyl)ethane or bis(trimethoxysilyl)ethane as a first layer followed by GPTMS as a second layer | $C_2$-GPTMS | 500 Å | 50° |
| 5 | Annealed bis(trichlorosilyl)ethane or bis(trimethoxysilyl)ethane | Annealed $C_2$ | 500 Å | 95° |
| 6 | Annealed bis(trichlorosilyl)ethane or bis(trimethoxysilyl)ethane as a first layer followed by annealed bis(trichlorosilyl)ethane or bis(trimethoxysilyl)ethane as a second layer | Annealed $C_2$-$C_2$ | 1600 Å | 95° |
| 7 | bis(trichlorosilyl)ethane or bis(trimethoxysilyl)ethane as a first layer followed by n-decyltrichlorosilane as a second layer | $C_2C_{10}$ | 500 Å | 105° |
| 8 | Annealed bis(trichlorosilyl)ethane or bis(trimethoxysilyl)ethane as a first layer followed by annealed n-decyltrichlorosilane as a second layer | Annealed $C_2C_{10}$ | 500 Å | 105° |
| 9 | GPTMS | GPTMS | 100 to 200 Å | −50° |
| 10 | GPTMS followed by hydrolysis to form GPTMS-OH | GPTMS-OH | 100 to 200 Å | −20° |
| 11 | bis(trichlorosilyl)ethane or bis(trimethoxysilyl)ethane as a first layer followed by trimethylchlorosilane or trimethyldimethylaminosilane | $C_2C_3$ | 500 Å | 40-90° |
| 12 | annealed bis(trichlorosilyl)ethane or bis(trimethoxysilyl)ethane as a first layer followed by trimethylchlorosilane or trimethyldimethylaminosilane | Annealed $C_2C_3$ | 500 Å | 95° |
| 13 | bis(trichlorosilyl)ethane or bis(trimethoxysilyl)ethane as a first layer followed by a methoxy-polyethyleneoxy(3) propyl trichlorosilane or methoxy-polyethyleneoxy(3) propyl trimethoxysilane | $C_2$PEO | 500 Å | 15° |

Active Coatings

In addition to inert coatings, it is also beneficial to modify flow path components with an organosilica (alkylsilyl) functionality that exhibits chemical properties that have an effect on the chromatographic separation. These so-called 'active' coatings can introduce a Coulombic repulsive effect with an analyte to shield them from interacting with the substrate material (e.g., metal, plastic, etc.) of the flow path in a way that negatively affects the chromatographic separation. In addition, an 'active' coating can be produced that adds an enhancing selectivity to a separation by way of a subtle secondary interaction. Moreover, an 'active' coating can be prepared that affords an entirely orthogonal retention mechanism, which facilitates the adsorption, partitioning, and desorption of analytes in a process distinct from that achieved with the stationary phase of a column. An active coating can also interact with the mobile phase to produce a desired effect on the chromatographic separation, for example, to enhance selectivity.

At least a portion of the wetted surfaces of the fluidic flow path are coated with an alkylsilyl coating having Formula IV:

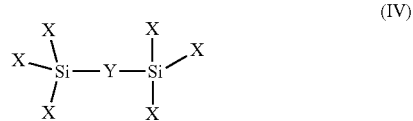

(IV)

Each X of Formula IV is independently selected from $(C_1\text{-}C_6)$alkoxy, —NH$(C_1\text{-}C_6)$alkyl, —N$((C_1\text{-}C_6)$alkyl$)_2$, OH, OR$^A$, R$^B$, R$^C$, R$^D$ and halo. In some embodiments, X of Formula IV is independently selected from OR$^A$, R$^B$, R$^C$, and R$^D$. $(C_1\text{-}C_6)$alkoxy, —NH$(C_1\text{-}C_6)$alkyl, —N$((C_1\text{-}C_6)$alkyl$)_2$, OH, and halo are reactive/hydrolysable groups. In some embodiments, these groups provide residual reactive groups where amino>halo>alkoxy as it relates to silane reactivity. In some embodiments, the specific coating that is used (e.g., the specific selection of X in Formula IV) depends on the type of chromatographic separation being performed. The goal is to create chemically stable (good longevity) coatings on various materials present in a chromatographic flow path. However, hydrophilic coatings have no interactions in reversed phase liquid chromatography, while hydrophilic coatings can exhibit some retention in hydrophilic interaction chromatography. While one coating may suffice for multiple different chemical separations, different coatings can also be used for different modes of liquid chromatography.

R$^A$ represents a point of attachment to the interior surfaces of the fluidic system and at least one X is OR$^A$. R$^B$ is absent or represents a hydrophobicity modifier. R$^C$ represents a charge modifier and at least one X is R$^C$. R$^D$ is absent, a chelator, or a crown ether. Y is a bridging moiety selected from $(C_1\text{-}C_{20})$alkyl, —O[(CH$_2$)$_2$O]$_{1\text{-}20}$—, —$(C_1\text{-}C_{10})$[NH(CO)NH$(C_1\text{-}C_{10})$]$_{1\text{-}20}$-, or —$(C_1\text{-}C_{10})$[alkylphenyl$(C_1\text{-}C_{10})$alkyl]$_{1\text{-}20}$-. The selection of Y can be dictated by both chemical and physical consideration.

Therefore, the alkylsilyl coating of Formula IV has at least one X that is OR$^A$, a point of attachment to the interior surfaces of the fluidic system and at least one X that is R$^C$, which represents a charge modifier. The hydrophobicity modifier R$^B$ and the chelator or crown ether R$^D$ can be absent. In some embodiments, the alkylsilyl coating of Formula IV has a charge modifier. In some embodiments, the alkylsilyl coating of Formula IV has a charge modifier and a hydrophobicity modifier. In some embodiments, the alkylsilyl coating of Formula IV has a charge modifier and a chelator or crown ether. In some embodiments, the alkylsilyl coating of Formula IV has a charge modifier, a hydrophobicity modifier and a chelator or crown ether.

In other embodiments, the alkylsilyl coating of Formula IV has at least one X that is OR$^A$, a point of attachment to the interior surfaces of the fluidic system and at least one X that is R$^C$, which represents a chelator or crown ether. In some embodiments, the alkylsilyl coating of Formula IV has a chelator or crown ether and a hydrophobicity modifier.

When used in the context of a chemical formula, a hyphen ("-") indicates the point of attachment. For example, when Y is —[$(C_1\text{-}C_{10})$alkylphenyl$(C_1\text{-}C_{10})$alkyl]$_{1\text{-}20}$-, that means that Y is connected to one SiX$_3$ via the $(C_1\text{-}C_{10})$alkyl and connected to the other SiX$_3$ via the other $(C_1\text{-}C_{10})$alkyl. This applies to the remaining variables.

In one embodiment, Y in Formula IV is $(C_1\text{-}C_{15})$alkyl, $(C_1\text{-}C_{12})$alkyl, or $(C_1\text{-}C_{10})$alkyl. In some embodiments, Y in Formula IV is methyl, ethyl, propyl, isopropyl, butyl, sec-butyl, iso-butyl, t-butyl, pentyl, hexyl, heptyl, nonyl, or decanyl. In other aspect, Y in Formula IV is ethyl or decanyl.

In some embodiments, X of Formula IV can be another Y bridging moiety. In this way, the alkylsilyl coating can have more than two Si atoms bridged by two separated Y bridging moieties. When multiple Y bridging moieties are in the alkyl silyl coating, the Y bridging moieties can be the same Y moiety or different Y moieties. Multiple bridging moieties can result in the alkylsily coating being in a straight chain or branched. In addition, an alkylsilyl coating having multiple Y bridging moieties can be hyper-crosslinked with extensive bridging. The first bridging alkylsilyl composition can be highly crosslinked with some surface heterogeneity and mix of bridging moieties and silanols. That surface can then be modified with one or more of the modifiers described herein (e.g., charge modifiers, hydrophobicity modifiers, chelators and/or crown ethers, or surfactants).

In some embodiments, the active alkylsilyl coating is comprised at least in part by Formula IV as described herein. In that way, the alkylsilyl coating of Formula I is at least a portion of the coating. The coating could have other Y bridging moieties with multiple modifiers as described herein.

In some embodiments a single modifier is used, for example, a single charge modifier. In other embodiment, multiple modifiers are used, for example, multiple charge modifiers or combinations or charge modifiers and hydrophobicity modifiers.

Charge Modifier (R$^C$)

Onto a suitable base layer, a charge modifying salinizing reagent can be applied. These charge bearing surface modifiers are comprised of strong acids/bases or weak acids/bases with a dissociation constant selected in a desirable range of pKa and can include but are not limited to trimethoxy silyl propyl methyl phosphonate and N,N-(diethylaminopropyl)trimethoxysilane. Surface modifiers with fixed charges, such as quaternary amines, can also be employed. For example for separation of nucleic acids or phosphopeptides that are negatively charged, the surface charge can be negative. In such case, the analytes are repelled from the surface and have no losses due to non-specific adsorption.

The charge modifier (R$^C$) can have the same charge as at least one analyte in the sample. When the charge modifier has the same charge as at least one analyte in the sample, the charge modifier introduces a Coulombic repulsive effect with the sample(s) having the same charge (i.e., like charges repel). This repulsive effect shields the analyte(s) from interacting with the substrate material of the flow path. The selection of an appropriate charge modifier can also depend on practical limitations, for example whether a suitable silane reagent can be sourced, or if it is to be synthesized, it is can be vaporized or made to be soluble in a suitable solvent system to carry out a reaction. In addition, the stability of the resulting coating should be considered. For example, a strong base that is also a nucleophile can be problematic because it can self catalyze its hydrolytic degradation.

In addition to introducing a Coulombic repulsive effect with the sample(s) having the same charge, charge modifiers can also facilitate multidimensional chromatography by strongly retaining a class of analytes by a retention mechanism that is orthogonal to that of an implemented liquid chromatography column. For example, analytes adsorb to a flow path component having an alkylsilyl coating with a charge modifier (e.g., a frit at the entrance of a chromatography column), are eluted to a downstream chromatography column in a gradient or set of discrete mobile phase changes and secondary gradients across the packed bed of the chromatography column are thereafter performed.

The charge modifier can be, for example, any one or more of the following charge modifiers: a quaternary amine,

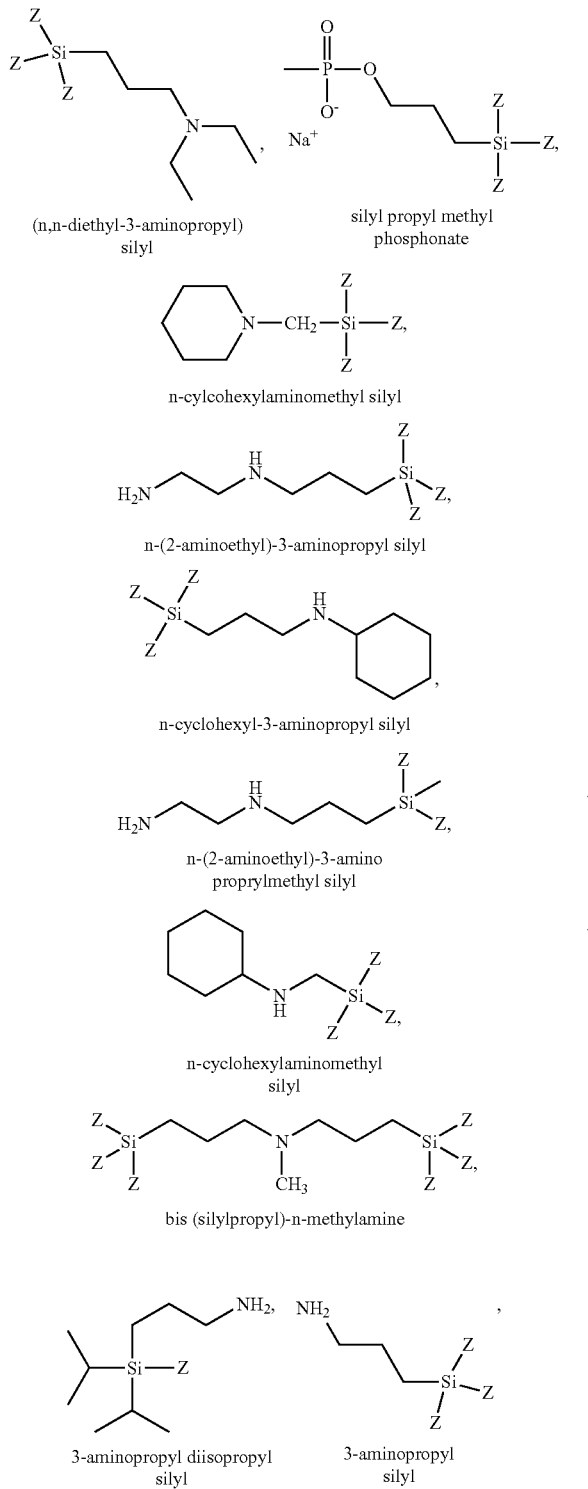

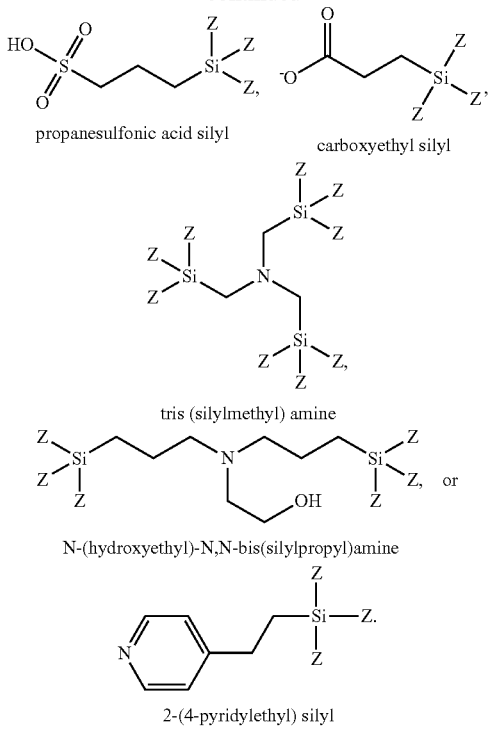

$Z$ is independently selected from $(C_1$-$C_6)$alkoxy, —NH($C_1$-$C_6$)alkyl, —N(($C_1$-$C_6$)alkyl)$_2$, OH, halo, or an attachment point to Formula IV. At least one Z is the attachment point to Formula IV. Therefore, the charge modifier is covalently bound to the alkylsilyl coating of Formula IV by a silyl ether moiety. A corresponding charge modifying reagent can be used to obtain the charge modifier of the final coating product, for example, the charge modifying reagent can be trimethoxy silyl propyl methyl phosphonate or N,N-(diethylaminopropyl) trimethoxysilane, or 2-(4-pyridylethyl)triethoxysilane.

In some embodiments, a single charge modifier is applied to the vapor deposited alkylsilyl (Formula IV). In other embodiments, multiple charge modifiers are applied to the vapor deposited alkylsilyl (Formula IV). The multiple charge modifiers can be the same charge modifier applied at multiple X positions of Formula IV. Alternatively, the multiple charge modifiers can be different charge modifiers applied at different X positions of Formula IV.

In some embodiments, a vapor deposition alylsilyl coating can be deliberately doped with a charged surface modifier ($R^C$), for example, the charged surface modifiers of U.S. Pat. No. 10,159,911 issued Dec. 25, 2018 and entitled "High Purity Chromatographic Materials Comprising an Ionizable Modifier," the entire contents of which is hereby incorporated by reference.

The charge modifier ($R^C$) can have a surface coverage of between about 0.01 µmol/m$^2$ to about 10 µmol/m$^2$. In some embodiments, the charge modifier ($R^C$) has a surface coverage of between about 0.02 µmol/m$^2$ to about 1 µmol/m$^2$. In some embodiment, the the charge modifier ($R^C$) has a surface coverage of between about 0.1 µmol/m$^2$ to about 1 µmol/m$^2$.

An example of an active coating having an alkylsilyl coating of Formula IV with a charge modifier ($R^C$) that can result from coating #3 of FIG. 7 is shown below. Although the final alkylsilyl coating shown below has multiple points for other charge modifiers ($R^C$) those points could also be ($C_1$-$C_6$)alkoxy, —NH($C_1$-$C_6$)alkyl, —N(($C_1$-$C_6$)alkyl)$_2$, OH, or a halo, as described herein. In addition, although the final alkylsilyl coating shown below has multiple points for other charge modifiers ($R^C$) those points could also be a hydrophobicity modifier ($R^B$) and/or chelators or crown ethers. The charge modifiers ($R^C$) shown below can also be other points of attachment to the surface of the chromatographic flow path, i.e., $R^A$.

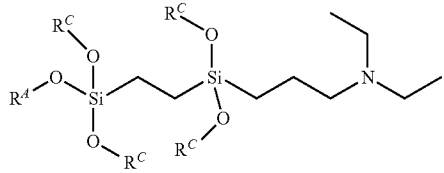

Hydrophobicity Modifier ($R^B$)

In some embodiments, the alkysilyl coating with a charge modifier ($R^C$) is combined with a hydrophobicity modifier ($R^B$). The hydrophobicity modifier can have a net neutral charge. Encompassed within the reagent choices of a hydrophobicity modifier are zwitterionic modifiers, such as carboxy- and sulfobetaine reagents. A zwitterionic modifier affords a macroscopically, net neutral surface, but also lends microscopic Coulombic effects that can be repulsive to a wide range of analytes, including those with diverse charge characteristics.

The hydrophobicity modifier ($R^B$) can have a surface coverage between about 0.01 0.01 µmol/m$^2$ to about 10 µmol/m$^2$. In some embodiments, the hydrophobicity modifier ($R^B$) has a surface coverage of between about 0.03 µmol/m$^2$ to about 0.9 µmol/m$^2$. In some embodiments, the hydrophobicity modifier ($R^B$) has a surface coverage of between about 0.5 µmol/m$^2$ to about 3 µmol/m$^2$.

The hydrophobicity modifier ($R^B$) is attached to Formula IV by a silyl ether moiety and has a composition selected the from one or more of the following:

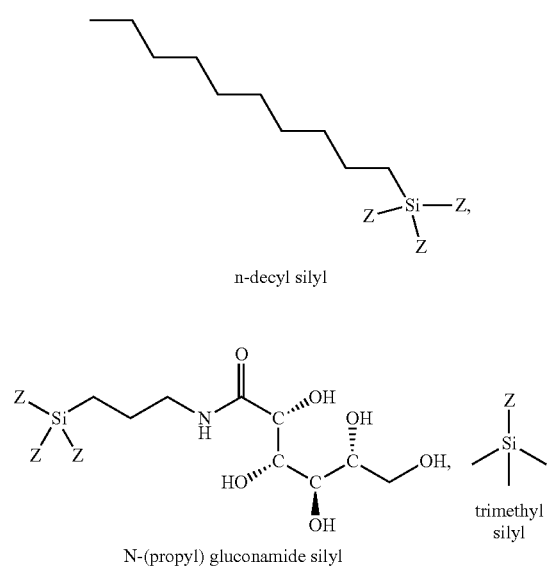

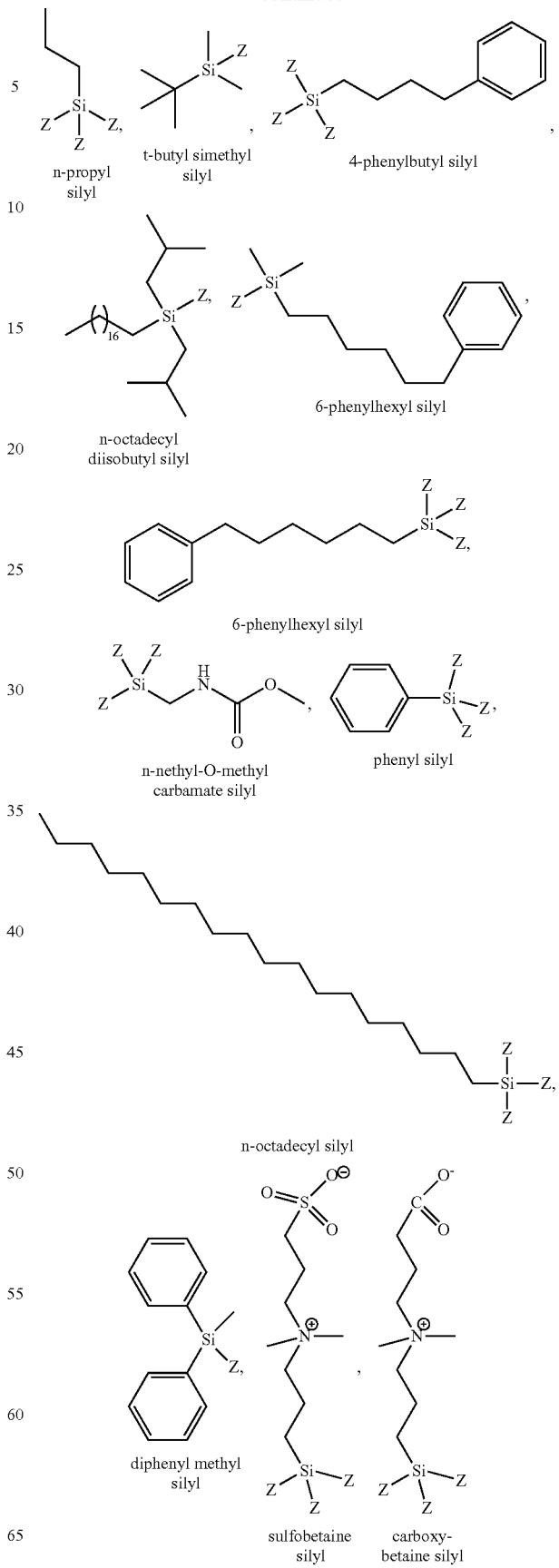

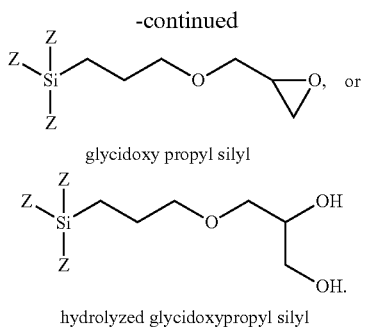

glycidoxy propyl silyl hydrolyzed glycidoxypropyl silyl

An example of an active coating having an alkylsilyl coating of Formula IV with a charge modifier ($R^C$) and a hydrophobicity modifier ($R^B$) that can result from coating #4 of FIG. 7 is shown below. Although the resulting coating shown below has multiple charge modifiers ($R^C$) any or all of those points could be a hydrophobicity modifier ($R^B$) or ($C_1$-$C_6$)alkoxy, —NH($C_1$-$C_6$)alkyl, —N(($C_1$-$C_6$)alkyl)$_2$, OH, or a halo or chelators or crown ethers, as described herein. In some embodiments, the charge modifier ($R^C$) and a hydrophobicity modifier ($R^B$) need not be directly linked, for example, the charge modifier ($R^C$) and a hydrophobicity modifier ($R^B$) can be connected through one or more bridging silicon moieties with Y (as defined herein) chemical compositions.

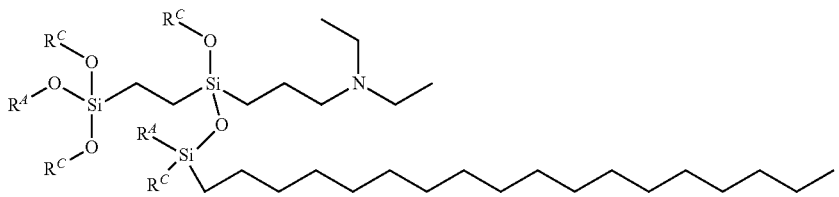

Z is independently selected from ($C_1$-$C_6$)alkoxy, —NH ($C_1$-$C_6$)alkyl, —N(($C_1$-$C_6$)alkyl)$_2$, OH, halo, or an attachment point to Formula I. At least one Z is the attachment point to Formula IV. Therefore, the hydrophobicity modifier is covalently bound to the alkylsilyl coating of Formula I by a silyl ether moiety. A corresponding hydrophobicity modifying reagent can be used to obtain the charge modifier of the final coating product, for example, the charge modifying reagent can be (3-glycidyloxypropyl)trimethoxysilane, hydrolyzed (3-glycidyloxypropyl)trimethoxysilane, n-decyltrichlorosilane, or N-(3-trimethoxysilylpropyl)gluconamide.

Several coatings corresponding to exemplary embodiments of the technology are shown in FIG. 7. These coatings include coatings having only a charge modifier ($R^C$), for example coating #s 1 and 3, as well as coatings having both a charge modifier ($R^C$) and a hydrophobicity modifier ($R^B$), for example coating #s 2, 4, and 5.

Hydrophobicity modifiers, in combination with the charge modifiers, can be used to add a subtle, but well controlled secondary interaction. Molecules that might otherwise co-elute as a consequence of having near identical hydrophobicities can pass through, for example a frit coated with coating #4 shown in FIG. 7, where the molecule can experience subtle ion exchange partitioning when a gradient between water and acetonitrile based mobile phases are applied with acid modifiers of varying acidity, hydrophobicity, and ion pairing strength. Formic acid modified mobile phases are particularly useful in this regard as it does not attenuate electrostatic effects. This can be particularly useful when separating, for example, peptides, assays for citric acid cycle metabolites and glycans. Hydrophobicity modifiers, in combination with the charge modifiers, can also be used in hydrophilic interaction chromatography.

Chelators and Crown Ethers ($R^D$)

In some embodiments, the alkysilyl coating with a charge modifier ($R^C$) is combined with an ion scavenging ligand, for example a chelator or crown ether. The chelator can be, for example, ethylenediaminetetraacetic acid or etidronic acid. The crown ether can be, for example, 18-crown-6, 12-crown-4, 15-crown-5, dibenzo-18-crown-6, or diaza-18-crown-6.

The chelators and crown ethers can be attached covalently to a silanized/alkylsilyl coating, either through direct covalent attachment or through the use of secondary linker moieties. The chelators and crown ethers can scavenge ions, for example, $Ca^{2+}$, $Fe^{3+}$ and/or $K^+$ that can be present in mobile phases, flow paths, and systems, which result in undesired gas phase ion adducts and cause the fouling and decommissioning of the mass spectrometer. For example, the chelator or crown ether can pull metal ions out of the mobile phase to improve MS spectra. Often, even MS grade mobile phases will contain trace amounts of metal ions, such as sodium and potassium, and it is common for the quality of the mass spectra to suffer, as a result. A 50 ppb concentration of potassium can yield a 2 to 10% relative intensity of potassiated adduct ion. An active coating such as this can sequester these metal ions, ensuring they are not present in the chromatographic effluent upon ionization. In turn, mass spectra can be obtained with ion adduct signals below 2% relative intensity even when mobile phases with questionable purity are employed. This type of coating can be used prior to an injector and post column in the flow path.

In some embodiments, the chelator and crown ethers can be combined directly with the alkylsilyl coating of Formula IV, without a charge modifier being present.

In some embodiments, the chelators and crown ethers can also be used in conjunction with the hydrophobicity modifiers described herein. In some embodiments, the chelators and crown ethers can be used in conjunction with both the charge modifiers and hydrophobicity modifiers described herein.

Therefore, when chelators and/or crown ethers are used as an active coating, a chromatographic device for separating analytes in a sample includes a sample injector having a sample injection needle for injecting the sample into the mobile phase, a sample reservoir container in fluid communication with the sample injector, a chromatography column downstream of the sample injector, the chromatography column having fluid connectors, and fluid conduits connecting the sample injector and the chromatography column. Interior surfaces of the fluid conduits, sample injector, sample reservoir container, and chromatography column form a fluidic flow path having wetted surfaces. At least a portion of the wetted surfaces of the fluidic flow path are coated with an alkylsilyl coating having the Formula IV:

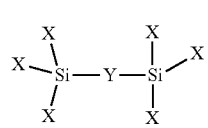
(IV)

wherein each X is independently selected from $(C_1-C_6)$ alkoxy, $—NH(C_1-C_6)alkyl$, $—N((C_1-C_6)alkyl)_2$, OH, $OR^A$, $R^B$, $R^C$, $R^D$ and halo. $R^A$ represents a point of attachment to the interior surfaces of the fluidic system and at least one X is $OR^A$. $R^B$ is absent or represents a hydrophobicity modifier. $R^C$ is absent or represents a charge modifier. $R^D$ represents a chelator, or a crown ether, and at least one X is $R^D$. Y is a bridging moiety selected from $(C_1-C_{20})alkyl$, $—O[(CH_2)_2 O]_{1-20}—$, $—(C_1-C_{10})[NH(CO)NH(C_1-C_{10})]_{1-20}—$, or $—(C_1-C_{10})[alkylphenyl(C_1-C_{10})alkyl]_{1-20}-$.

Bacteriostatic Modifiers

In some embodiments, a chromatographic device for separating analytes in a sample includes a mobile phase reservoir, a mobile phase pump in communication with the mobile phase reservoir, a mobile phase inlet line have a first end in communication with the mobile phase reservoir and a second end in communication with the mobile phase pump, and a sinker at the first end of the mobile phase inlet line. Interior surfaces of the mobile phase reservoir, the mobile phase pump and the mobile phase inlet line form a fluidic flow path having wetted surfaces. Exterior surfaces of the sinker also have wetted surfaces, which are in contact with the mobile phase. At least a portion of the wetted surfaces in contact with the mobile phase are coated with an alkylsilyl coating having the Formula IV:

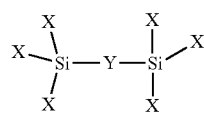
(IV)

wherein each X is independently selected from $(C_1-C_6)$ alkoxy, $—NH(C_1-C_6)alkyl$, $—N((C_1-C_6)alkyl)_2$, OH, $OR^A$, $R^B$, $R^C$, $R^D$, $R^E$, and halo. $R^A$ represents a point of attachment to the interior surfaces of the fluidic system and at least one X is $OR^A$. $R^B$ is absent or represents a hydrophobicity modifier. $R^C$ is absent or represents a charge modifier. $R^D$ is absent or represents a chelator, or a crown ether. $R^E$ is a bacteriostatic moiety, and at least one X is $R^E$. Y is a bridging moiety selected from $(C_1-C_{20})alkyl$, $—O[(CH_2)_2 O]_{1-20}—$, $—(C_1-C_{10})[NH(CO)NH(C_1-C_{10})]_{1-20}—$, or $—(C_1-C_{10})[alkylphenyl(C_1-C_{10})alkyl]_{1-20}-$.

In some embodiments, the bacteriostatic moiety is a zwitterion. The zwitterionic coatings can be prepared by silanization with bis(trichlorosilyl)ethane followed by derivatization with N,N-(diethylaminopropyl)trimethoxysilane and subsequent reactions with chloro or bromo alkylcarboxylic acids. In some embodiments, the bacteriostatic moiety is a quaternary amine.

In some embodiments the bacteriostatic coating is applied to all components within the flow path including inlet filters, inlet mobile phase lines, pumps, transfer lines, sample syringes, frits and mobile phase containers (see, e.g., FIG. 1) to provide systemic protection against bacterial growth and premature column failure.

The bacteriostatic moiety can be used alone, or in conjunction with a charge modifier, a hydrophobicity modifier and/or a chelator or crown ether.

Surfactants

In some embodiments, surfactants can be used as an active coating to solubilize proteins, including hydrophobic membrane proteins, and provide a denaturing environment that facilitates enzyme reactions, such as proteolysis and glycan release.

A chromatographic device for separating analytes in a sample includes a sample injector having a sample injection needle for injecting the sample into the mobile phase, a sample reservoir container in fluid communication with the sample injector, a chromatography column downstream of the sample injector, the chromatography column having fluid connectors, and fluid conduits connecting the sample injector and the chromatography column. Interior surfaces of the fluid conduits, sample injector, sample reservoir container, and chromatography column form a fluidic flow path having wetted surfaces. At least a portion of the wetted surfaces of the fluidic flow path are coated with an alkylsilyl coating having the Formula IV:

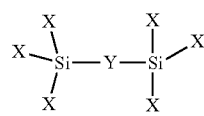
(IV)

wherein each X is independently selected from $(C_1-C_6)$ alkoxy, $—NH(C_1-C_6)alkyl$, $—N((C_1-C_6)alkyl)_2$, OH, $OR^A$, $R^B$, $R^C$, $R^D$, $R^E$, $R^F$, and halo. $R^A$ represents a point of attachment to the interior surfaces of the fluidic system and at least one X is $OR^A$. $R^B$ is absent or represents a hydrophobicity modifier. $R^C$ is absent or represents a charge modifier. $R^D$ is absent or represents a chelator, or a crown ether. $R^E$ is absent or represents a bacteriostatic moiety. $R^F$ represents a surfactant, and at least one X is $R^F$. Y is a bridging moiety selected from $(C_1-C_{20})alkyl$, $—O[(CH_2)_2 O]_{1-20}—$, $—(C_1-C_{10})[NH(CO)NH(C_1-C_{10})]_{1-20}—$, or $—(C_1-C_{10})[alkylphenyl(C_1-C_{10})alkyl]_{1-20}-$.

In some embodiments, the surfactant ($R^F$) is sodium dodecyl sulfate, zwittergent 3-10 (Decyldimethylammonio) propanesulfonate, sodium deoxycholate, hexadecyl trimethyl ammonium bromide, triton, polysorbate, or a combination thereof.

Methods

The devices (filters, connectors, assemblies) described herein can be used in chromatographic methods to separate analytes in a sample, In general, the method includes introducing a sample including the analytes into a chromatographic system (e.g., a liquid chromatography system). The chromatography system includes a flow path disposed in an interior of the chromatographic system where at least a portion of the flow path has an alkylsilyl coating (for example, any of the coatings described herein). The chromatographic system also includes a chromatographic column that has a stationary phase material in an interior of the chromatographic column that facilitates separation of the analytes in the sample through interaction with at least one analyte in the sample. For example, the chromatographic system can be the chromatographic system of FIG. 1 as described in detail herein.

Kits

The technology also includes kits. The kits include a chromatographic components, for example, a chromatographic column, that has been coated with an alkylsilyl coating of, as described above. The kits also includes at least one filter, assembly or connector having a soft seal design and coated with the alkylsilyl coating. In some embodiments, the alkylsilyl coating on the column is the same as that on the soft seal connector. In other embodiments, the alkylsilyl coating on the column is different than that on the soft seal connector. Other components can be provided in the kit that can also include the coatings described herein, for example, tubing. The kit can also include instructions for separating analytes, for example, biomolecules, proteins, glycans, peptides, oligonucleotides, pesticides, bisphosphonic acids, anionic or cationic compounds, and zwitterions like amino acids and neurotransmitters.

Example 1

A standard solution of a phosphopeptide mix containing four yeast Enolase derived phosphorylated peptides (Waters p/n 186003286), identified as T18p, T19p, T43p and T43pp was used to conduct this analysis (p=monophosphorylated; pp=doubly phosphorylated). The T43pp is of particular interest in this analysis due to its anionic nature and its concomitant propensity to bind to metallic system components.

Analysis of the phosphorylated peptide mix was performed by reverse phase separation using bridged ethylene hybrid C18 stationary phase according to the method parameters below. Before packing, the column body and frits were coated with a $C_2C_3$ coating (or similar) to provide protection against metallo-phosphate ligand formation between the phosphorylated analyte and the metal in the LC flow path. Column end nuts in either the standard or soft seal designation were then used to seal the column before analysis. Standard endcaps utilize a metal on metal sealing arrangement and damage the coating during assembly.

Detection of ions was performed by tandem quadrupole mass spectrometer operating in positive ion mode. Each phosphorylated analyte was tuned to optimize both parent and fragment ion intensities.

The LC conditions used in this example are shown in Table 2 and the gradient is shown in Table 3.

TABLE 2

LC Conditions

| | |
|---|---|
| Columns: | BEH C18 130 Å 1.7 µm 2.1 × 50 mm |
| Mobile Phase A: | 0.1% Formic acid in $H_2O$ |
| Mobile Phase B: | 0.1% Formic acid in ACN |
| Column Temperature: | 50° C. |
| Injection Volume: | 2 µL (100 nmol/mL sample concentrations) |
| Sample Diluent: | Water |
| Detection: | Tandem quadrupole mass spectrometer operating in ESI positive ionization mode and with MRM acquisition |

TABLE 3

Gradient Table

| Time (min) | Flow Rate (ml/min) | % A | % B | Curve |
|---|---|---|---|---|
| Initial | 0.50 | 99 | 1 | Initial |
| 0.5 | 0.50 | 99 | 1 | 6 |
| 2.0 | 0.50 | 50 | 50 | 6 |
| 2.5 | 0.50 | 5 | 95 | 6 |
| 3.0 | 0.50 | 5 | 95 | 6 |
| 3.5 | 0.50 | 99 | 1 | 6 |
| 4.0 | 0.50 | 99 | 1 | 6 |

FIGS. 8A and 8B show the comparative data between the extracted ion for T43pp when utilizing thin film coated columns assembled using either the standard endnut metal-on-metal column construction (FIG. 8A) or a soft seal construction (FIG. 8B). The metal-on-metal seal hardware had the endnuts, frits, seal ring, and column coated with a $C_2C_3$ coating (or similar). With the metal-on-metal seal design, the endnut incorporates the ferrule cone and has a small through hole in the flow path. The soft seal hardware had the filter housing, seal ring, frit, and column tube coated with a $C_2C_3$ coating (or similar). The soft seal hardware does not have an endnut in the flow path. Therefore, both the metal-on-metal seal and the softseal had coating on all flow path components.

It is observed that the ion corresponding to T43pp does not appear with the standard metal-on-metal column construction configuration. The injection shown represents the twentieth injection of the analyte standard mix that was made onto that column. That even after 20 injections no signal could be observed indicates there is an on-going and persistent loss of analyte due to metallo-phosphate interactions. In contrast to this result, is that obtained with a column assembled with a soft seal construction design. When employed for this analysis, the softseal, vapor deposition coated column produced signal for the T43pp ion, even upon its very first use and injection.

Example 2

A standard solution of a phosphopeptide mix containing four yeast Enolase derived phosphorylated peptides (Waters p/n 186003285; lot W19031802), identified as T18p, T19p, T43p and T43pp, 1 nmol each, was used to conduct this analysis (p=monophosphorylated; pp=doubly phosphorylated). The T19p and T43pp are of particular interest in this analysis due to its anionic nature and its concomitant propensity to bind to metallic system components.

Analysis of the phosphorylated peptide mix was performed by reverse phase separation using (1) charged surface hybrid (CSH) C18 stationary phase coated with C2C3 soft seal hardware (FIG. 9A), (2) charged surface hybrid (CSH) C18 stationary phase uncoated soft seal hardware (FIG. 9B) and (3) Phenomenex bioZen C18 uncoated, metal on metal seal with Ti hardware (FIG. 9C). In this example, the 15 µL injection needle, seat port assembly tubing and the active column pre-heater were coated with a C2C3 coating, The LC conditions used in this example are shown in Table 4 and the gradient is shown in Table 5.

TABLE 4

LC Conditions

| | |
|---|---|
| Columns: | 1. (FIG. 9A) 2.1 × 50 CSH C18 C2C3 coating soft seal hardware |

TABLE 4-continued

| LC Conditions | |
|---|---|
| | 2. (FIG. 9B) 2.1 × 50 CSH C18 uncoated soft seal hardware |
| | 3. (FIG. 9C) Phenomenex bioZen C18 uncoated metal on metal seal, Ti hardware |
| Mobile Phase A: | 0.1% Formic acid in H₂O |
| Mobile Phase B: | 0.075% Formic acid in ACN |
| Column Temperature: | 60° C. |
| Injection Volume: | 10 µL |
| Sample Diluent: | Water (reconstitution: 50 µL of 0.1% F.A. in water per vial, combine 3 vials into Q-Sert vial (Waters p/n 186001126C) per lot |
| Detection: | TUV Detector: 220 nm |

TABLE 5

Gradient Table

| Time (min) | Flow Rate (ml/min) | % A | % B | Curve |
|---|---|---|---|---|
| 0 | 0.6 | 99.3 | 0.7 | |
| 5 | 0.6 | 75 | 25 | Linear |

As is shown in a comparison of FIGS. 9A, 9B, and 9C, when a $C_2C_3$ coating is used on soft seal hardware (as described herein) a signal for the ion associated with T19p and T43pp can be seen (FIG. 9A), while these signals cannot be seen with uncoated soft seal hardware (FIG. 9B) or metal on metal seal (FIG. 9C).

While this disclosure has been particularly shown and described with reference to example embodiments thereof, it will be understood by those skilled in the art that various changes in form and details may be made therein without departing from the scope of the technology encompassed by the appended claims.

What is claimed is:

1. A chromatographic column for separating analytes in a sample, the chromatographic column comprising:
   a column body having an interior surface, at least a portion of the interior surface coated with an alkylsilyl coating; and
   a filter configured to connect to the column, the filter comprising
       a porous element, at least a portion of the porous element coated with the alkylsilyl coating;
       a compression element configured to receive the porous element thereby forming an assembly; and
       a housing having an opening formed therein, the opening configured to receive the assembly,
   wherein the assembly is retained within the opening when the assembly is received therein; and
   wherein the alkylsilyl coating is undamaged when the filter is connected to the column body.

2. The chromatographic column of claim 1, wherein the alkylsilyl coating has the Formula I:

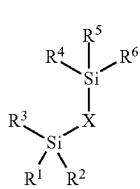

(I)

wherein $R^1$, $R^2$, $R^3$, $R^4$, $R^5$, and $R^6$ are each independently selected from $(C_1-C_6)$alkoxy, —NH$(C_1-C_6)$alkyl, —N$((C_1-C_6)$alkyl$)_2$, OH, OR$^A$, and halo;

$R^A$ represents a point of attachment to the interior surfaces of the fluidic system;

at least one of $R^1$, $R^2$, $R^3$, $R^4$, $R^5$, and $R^6$ is OR$^A$; and

X is $(C_1-C_{20})$alkyl, —O[$(CH_2)_2$O]$_{1-20}$—, —$(C_1-C_{10})$[NH(CO)NH$(C_1-C_{10})$]$_{1-20}$—, or —$(C_1-C_{10})$[alkylphenyl$(C_1-C_{10})$alkyl]$_{1-20}$—.

3. The chromatographic column of claim 2, wherein X is $(C_2-C_{10})$alkyl.

4. The chromatographic column of claim 2, wherein X is ethyl.

5. The chromatographic column of claim 2, wherein $R^1$, $R^2$, $R^3$, $R^4$, $R^5$, and $R^6$ are each methoxy or chloro.

6. The chromatographic column of claim 2, wherein the alkylsilyl coating of Formula I is bis(trichlorosilyl)ethane or bis(trimethoxysilyl)ethane.

7. The chromatographic column of claim 2, further comprising a second alkylsilyl coating in direct contact with the alkylsilyl coating of Formula I, the second alkylsilyl coating having the Formula II:

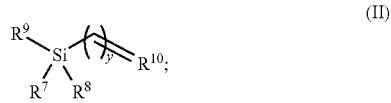

(II)

wherein $R^7$, $R^8$, and $R^9$ are each independently selected from —NH$(C_1-C_6)$alkyl, —N$[(C_1-C_6)$alkyl$]_2$, $(C_1-C_6)$alkoxy, $(C_1-C_6)$alkyl, $(C_1-C_6)$alkenyl, OH, and halo;

$R^{10}$ is selected from $(C_1-C_6)$alkyl, —OR$^B$, —[O$(C_1-C_3)$alkyl]$_{1-10}$O$(C_1-C_6)$alkyl, and phenyl, wherein said $(C_1-C_6)$alkyl is optionally substituted with one or more halo and wherein said phenyl is optionally substituted with one or more groups selected from $(C_1-C_3)$alkyl, hydroxyl, fluorine, chlorine, bromine, cyano, —C(O)NH$_2$, and carboxyl;

$R^B$ is —$(C_1-C_3)$alkyloxirane, —$(C_1-C_3)$alkyl-3,4-epoxycyclohexyl, or —$(C_1-C_4)$alkylOH;

the hashed bond to $R^{10}$ represents an optional additional covalent bond between $R^{10}$ and the carbon bridging the silyl group to form an alkene, provided y is not 0; and y is an integer from 0 to 20.

8. The chromatographic column of claim 7, wherein y is an integer from 2 to 9.

9. The chromatographic column of claim 7, wherein y is 9, $R^{10}$ is methyl, and $R^7$, $R^8$, and $R^9$ are each methoxy, ethoxy or chloro.

10. The chromatographic column of claim 7, wherein the alkylsilyl coating of Formula I is bis(trichlorosilyl)ethane or bis(trimethoxysilyl)ethane and the alkylsilyl coating of Formula II is (3-glycidyloxypropyl)trimethoxysilane followed by hydrolysis.

11. The chromatographic column of claim 2, further comprising a alkylsilyl coating having the Formula III in direct contact with the alkylsilyl coating of Formula I,

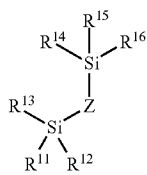

(III)

wherein
$R^{11}$, $R^{12}$, $R^{13}$, $R^{14}$, $R^{15}$, and $R^{16}$ are each independently selected from $(C_1-C_6)$alkoxy, —NH$(C_1-C_6)$alkyl, —N$((C_1-C_6)$alkyl$)_2$, OH, and halo; and Z is $(C_1-C_{20})$alkyl, —O$[(CH_2)_2O]_{1-20}$—, —$(C_1-C_{10})$[NH(CO)NH$(C_1-C_{10})]_{1-20}$—, or —$(C_1-C_{10})$[alkylphenyl$(C_1-C_{10})$alkyl$]_{1-20}$-.

12. The chromatographic column of claim 11, wherein the alkylsilyl coating of Formula I is bis(trichlorosilyl)ethane or bis(trimethoxysilyl)ethane and the alkylsilyl coating of Formula III is bis(trichlorosilyl)ethane or bis(trimethoxysilyl)ethane.

13. An assembly for a chromatographic system, the assembly comprising:
tubing having a first end, a second end and an interior surface coated with an alkylsilyl coating; and
a ferrule comprised of a plastic or elastomeric material having a first end, a second end and an opening formed therein from the first end to the second end, the ferrule positioned at the first end of the tubing with the tubing positioned in the opening of the ferrule, wherein the ferrule has a surface coated with the alkylsilyl coating.

14. The assembly of claim 13, wherein the alkylsilyl coating is undamaged when the assembly is connected to a chromatographic component.

15. The assembly of claim 14, wherein the chromatographic component is an injection needle, a sample loop, pre-heater tube, or a detector flow cell component.

16. The assembly of claim 13, wherein the alkylsilyl coating has the Formula I:

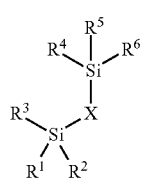

(I)

wherein
$R^1$, $R^2$, $R^3$, $R^4$, $R^5$, and $R^6$ are each independently selected from $(C_1-C_6)$alkoxy, —NH$(C_1-C_6)$alkyl, —N$((C_1-C_6)$alkyl$)_2$, OH, OR$^A$, and halo;
$R^A$ represents a point of attachment to the interior surfaces of the fluidic system;
at least one of $R^1$, $R^2$, $R^3$, $R^4$, $R^5$, and $R^6$ is OR$^A$; and
X is $(C_1-C_{20})$alkyl, —O$[(CH_2)_2O]_{1-20}$—, —$(C_1-C_{10})$[NH(CO)NH$(C_1-C_{10})]_{1-20}$—, or —$(C_1-C_{10})$[alkylphenyl$(C_1-C_{10})$alkyl$]_{1-20}$-.

17. The assembly of claim 16, wherein X is $(C_2-C_{10})$alkyl.
18. The assembly of claim 16, wherein X is ethyl.
19. The assembly of claim 16, wherein $R^1$, $R^2$, $R^3$, $R^4$, $R^5$, and $R^6$ are each methoxy or chloro.

20. The assembly of claim 16, further comprising a second alkylsilyl coating in direct contact with the alkylsilyl coating of Formula I, the second alkylsilyl coating having the Formula II:

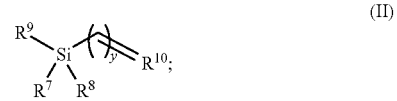

(II)

wherein
$R^7$, $R^8$, and $R^9$ are each independently selected from —NH$(C_1-C_6)$alkyl, —N$[(C_1-C_6)$alkyl$]_2$, $(C_1-C_6)$alkoxy, $(C_1-C_6)$alkyl, $(C_1-C_6)$alkenyl, OH, and halo;
$R_{10}$ is selected from $(C_1-C_6)$alkyl, —OR$^B$, —[O$(C_1-C_3)$alkyl$]_{1-10}$O$(C_1-C_6)$alkyl, and phenyl, wherein said $(C_1-C_6)$alkyl is optionally substituted with one or more halo and wherein said phenyl is optionally substituted with one or more groups selected from $(C_1-C_3)$alkyl, hydroxyl, fluorine, chlorine, bromine, cyano, —C(O)NH$_2$, and carboxyl;
$R^B$ is —$(C_1-C_3)$alkyloxirane, —$(C_1-C_3)$alkyl-3,4-epoxycyclohexyl, or —$(C_1-C_4)$alkylOH;
the hashed bond to $R^{10}$ represents an optional additional covalent bond between $R^{10}$ and the carbon bridging the silyl group to form an alkene, provided y is not 0; and
y is an integer from 0 to 20.

21. The assembly of claim 20, wherein y is an integer from 2 to 9.
22. The assembly of claim 20, wherein y is 9, $R^{10}$ is methyl, and $R^7$, $R^8$, and $R^9$ are each methoxy, ethoxy or chloro.
23. The assembly of claim 20, wherein the alkylsilyl coating of Formula I is bis(trichlorosilyl)ethane or bis(trimethoxysilyl)ethane and the alkylsilyl coating of Formula II is (3-glycidyloxypropyl)trimethoxysilane followed by hydrolysis.
24. The assembly of claim 16, further comprising a alkylsilyl coating having the Formula III in direct contact with the alkylsilyl coating of Formula I,

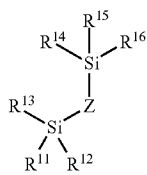

(III)

wherein
$R^{11}$, $R^{12}$, $R^{13}$, $R^{14}$, $R^{15}$, and $R^{16}$ are each independently selected from $(C_1-C_6)$alkoxy, —NH$(C_1-C_6)$alkyl, —N$((C_1-C_6)$alkyl$)_2$, OH, and halo; and Z is $(C_1-C_{20})$alkyl, —O$[(CH_2)_2O]_{1-20}$—, —$(C_1-C_{10})$[NH(CO)NH$(C_1-C_{10})]_{1-20}$—, or —$(C_1-C_{10})$[alkylphenyl$(C_1-C_{10})$alkyl$]_{1-20}$-.

25. The assembly of claim 24, wherein the alkylsilyl coating of Formula I is bis(trichlorosilyl)ethane or bis(trimethoxysilyl)ethane and the alkylsilyl coating of Formula III is bis(trichlorosilyl)ethane or bis(trimethoxysilyl)ethane.

* * * * *